(12) United States Patent
Wang et al.

(10) Patent No.: US 10,849,191 B2
(45) Date of Patent: Nov. 24, 2020

(54) UNIFIED AUTHENTICATION FOR HETEROGENEOUS NETWORKS

(71) Applicant: HUAWEI INTERNATIONAL PTE. LTD., Singapore (SG)

(72) Inventors: Haiguang Wang, Singapore (SG); Lichun Li, Shenzhen (CN); Xin Kang, Singapore (SG); Jie Shi, Singapore (SG)

(73) Assignee: Huawei International Pte., Ltd., Singapore (SG)

( * ) Notice: Subject to any disclaimer, the term of this patent is extended or adjusted under 35 U.S.C. 154(b) by 0 days.

(21) Appl. No.: 16/246,275

(22) Filed: Jan. 11, 2019

(65) Prior Publication Data

US 2019/0149990 A1 May 16, 2019

Related U.S. Application Data

(63) Continuation of application No. PCT/SG2017/050163, filed on Mar. 28, 2017.

(30) Foreign Application Priority Data

Jul. 13, 2016 (SG) .......................... 10201605752P

(51) Int. Cl.
*H04W 88/06* (2009.01)
*H04W 12/06* (2009.01)
(Continued)

(52) U.S. Cl.
CPC ............. *H04W 88/06* (2013.01); *H04W 8/04* (2013.01); *H04W 8/08* (2013.01);
(Continued)

(58) Field of Classification Search
CPC ....... H04W 12/0401; H04W 12/04071; H04W 12/06; H04W 12/10; H04W 36/0038;
(Continued)

(56) References Cited

U.S. PATENT DOCUMENTS 8,462,742 B2 * 6/2013 Song ............... H04W 12/04031
370/338
2004/0192309 A1 * 9/2004 Watanabe ......... H04W 36/0038
455/439
(Continued)

FOREIGN PATENT DOCUMENTS

CN       102421097 A    4/2012
CN       101594616 B    5/2012
(Continued)

OTHER PUBLICATIONS

"3rd Generation Partnership Project; Technical Specification Group Services and System Aspects; Study on Architecture for Next Generation System (Release 14)," 3GPP TR 23.799 V0.5.0, pp. 1-236, 3rd Generation Partnership Project—Valbonne, France (May 2016).

(Continued)

*Primary Examiner* — Kashif Siddiqui
(74) *Attorney, Agent, or Firm* — Leydig, Voit & Mayer, Ltd.

(57) ABSTRACT

A User Equipment (UE) for communicating directly with a core network is provided. The UE comprises: a first communication device; a second communication device; an authentication management module; a processor; a storage medium; instructions stored on the storage medium and executable by the processor to: perform a first authentication with the core network to obtain a security context; transmit a security context from the authentication management module to at least one of the first and second communication devices; and perform a second authentication for one of the first and second communication devices with the core network using the security context from the authentication management module to establish connection with the core network.

20 Claims, 25 Drawing Sheets

(51) Int. Cl.
    *H04W 12/04*     (2009.01)
    *H04W 8/04*     (2009.01)
    *H04W 8/08*     (2009.01)
    *H04W 80/02*     (2009.01)
    *H04W 84/04*     (2009.01)
    *H04W 36/00*     (2009.01)

(52) U.S. Cl.
    CPC . *H04W 12/0401* (2019.01); *H04W 12/04071* (2019.01); *H04W 12/0609* (2019.01); *H04W 80/02* (2013.01); *H04W 36/0038* (2013.01); *H04W 84/042* (2013.01)

(58) Field of Classification Search
    CPC ... H04W 80/02; H04W 84/042; H04W 88/06; H04W 8/04; H04W 8/08
    See application file for complete search history.

(56) References Cited

U.S. PATENT DOCUMENTS

| | | | |
|---|---|---|---|
| 2010/0180111 A1* | 7/2010 | Hahn | H04W 12/06 713/150 |
| 2011/0047382 A1* | 2/2011 | Wang | H04W 12/0401 713/170 |
| 2011/0090870 A1 | 4/2011 | Roenneke et al. | |
| 2013/0007858 A1 | 1/2013 | Shah et al. | |
| 2013/0298209 A1 | 11/2013 | Targali et al. | |
| 2014/0181515 A1 | 6/2014 | Yang | |
| 2014/0181904 A1* | 6/2014 | Craig | H04L 63/0892 726/3 |
| 2017/0208511 A1 | 7/2017 | Craig et al. | |

FOREIGN PATENT DOCUMENTS

| | | |
|---|---|---|
| CN | 103906056 A | 7/2014 |
| CN | 104854892 A | 8/2015 |
| CN | 103609154 B | 8/2017 |
| JP | 2009531952 A | 9/2009 |
| KR | 20130018299 A | 2/2013 |
| WO | 2007102702 A2 | 9/2007 |
| WO | 2007114623 A1 | 10/2007 |
| WO | 2011130682 A2 | 10/2011 |
| WO | 2013181847 A1 | 12/2013 |

OTHER PUBLICATIONS

"Security Context and Key Management," 3GPP TSG SA WG3 (Security) Meeting #84, S3-161005, Chennal (India), pp. 1-5, 3rd Generation Partnership Project—Valbonne, France (Jul. 25-29, 2016).

Cao et al.,"EAP Extensions for the EAP Re-authentication Protocol (ERP)", Internet Engineering Task Force (IETF), pp. 1-47, RFC6696 (Jul. 2012).

"Solution X for Key Issue 12 on Authentication Framework," SA WG2 Meeting #114, pp. 1-4, Sophia Antipolis, S2-161497, 3rd Generation Partnership Project—Valbonne, France (Apr. 11-15, 2016).

"Solution to Key Issue 12 on authentication," SA WG2 Meeting #114, pp. 1-4, S2-161716, Sophia Antipolis, 3rd Generation Partnership Project—Valbonne, France (Apr. 11-15, 2016).

"Solution X for Key Issue 12 on Authentication Framework," S2-162123 (revision of S2-161497), SA WG2 Meeting #114, Sophia Antipolis, FR, pp. 1-4, 3rd Generation Partnership Project—Valbonne, France (Apr. 11-15, 2016).

"Security Context Information Sharing for 3GPP and Non-3GPP Access", S3-160825 Revision of S3-1605703GPP TSG SA WG3 (Security) Meeting #83, San Jose Del Cabo, Mexico, pp. 1-3, 3rd Generation Partnership Project—Valbonne, France (May 9-13, 2016).

"Threats for Security Context Sharing," 3GPP TSG SA WG3 (Security) Meeting #84, S3-161274 revision of S3-16100725-Chennal (India), pp. 1.2, 3rd Generation Partnership Project—Valbonne, France (Jul. 29, 2016).

"Security Context and Key Management",3GPP TSG SA WG3 (Security) Meeting #84, Chennal (India),pp. 1-5, S3-161278 revision of S3-161005, 3rd Generation Partnership Project—Valbonne, France (Jul. 25-29, 2016).

"3rd Generation Partnership Project; Technical Specification Group Services and System Aspects; 3GPP System Architecture Evolution (SAE); Security aspects of non-3GPP accesses (Release 13)," pp. 1-56, 3GPP TS 33.402 V13.0.0, 3rd Generation Partnership Project—Valbonne, France (Sep. 2015).

De La Oliva et al.,"OmniRAN SDN Use Cases and Requirements" pp. 1-11, omniran-14-0041-00-CF00 (May 15, 2014).

"Authentication and encryption between UE and WLAN for aggregation," 3GPP TSG-RAN WG2 Meeting #90, Fukuoka, Japan, R2-152655, 3rd Generation Partnership Project, Valbonne, France (May 25-29, 2015).

\* cited by examiner

UNIFIED AUTHENTICATION FOR HETEROGENEOUS NETWORKS

CROSS-REFERENCE TO RELATED APPLICATIONS

This application is a continuation of International Application No. PCT/SG2017/050163, filed on Mar. 28, 2017, which claims priority to Singapore Application No. 10201605752P, filed on Jul. 13, 2016. The disclosures of the aforementioned applications are hereby incorporated by reference in their entireties.

FIELD OF THE INVENTION

Embodiments of this disclosure relate to a method and system a unified authentication framework for collaborative authenticating of mobile devices to access a core network. Particularly, this invention relates to a method and system a unified authentication framework for collaborative authenticating between a mobile device and a core network.

SUMMARY OF THE PRIOR ART

In the past few years, the number of smart phone users has grown rapidly and many mobile users access the internet via mobile cellular network. However, current cellular technology such as Wideband Code Division Multiple Access (WCDMA) or Long Term Evolution (LTE) is unable to coop with the rapid growth of the mobile internet traffic. To meet the demand from mobile users, the communications service provider (CSP) or also known as telco or telecommunications operators have been exploiting the potential of the Wireless Fidelity (Wi-Fi) technology to complement the capacity shortage.

In a cellular network, the Wi-Fi technology is not a native technology. Therefore, to integrate the Wi-Fi technology in a 3GPP defined cellular network, a few specifications have been defined, including the security, by the 3GPP. FIG. 1 shows a network architecture that integrates the Wi-Fi access technology, including both trusted and untrusted Wi-Fi. For purpose of this disclosure, trusted Wi-Fi access refers to cases where the Access Point for the User Equipment (UE) to connect to is deployed by the telecommunications operators themselves. Untrusted Wi-Fi access refers to cases where the Access Point is deployed by third parties other than the telecommunications operators.

Normally, to ensure that the devices and networks are genuine, the first step for the UE to access the network is to authenticate with network mutually. With 3GPP network, Universe Subscriber Identity Module (USIM) based pre-shared key authentication is adopted. A pair of shared keys is preserved at both UE and network side. At the UE side, the credential is preserved in the USIM card, which is an independent devices embedded in the UE. At the network side, credentials are preserved in the Home Subscriber System (HSS). During the authentication, authentication vectors or master session keys are derived from the pre-served credentials. The UE and network use the authentication vector to authenticate with each other.

With the current 3GPP and Wi-Fi integration framework, the UE authenticates with network with the credentials preserved in the USIM. However, the authentication and key generation protocols used by the LTE and Wi-Fi technology are different. With the LTE technology, the UE and Mobility Management Entity (MME) server of the network use Evolved Packet System Authentication and Key Agreement (EPS-AKA) protocols to do the mutual authentication. On the other hand, with the Wi-Fi technology, the UE and Authentication, Authorization, and Accounting (AAA) server of the network use (Extensible Authentication Protocol) EAP-AKA or EAP-AKA' protocols to do the mutual authentication. Based on the existing framework, the same UE has to use two different protocols to authenticate with the same network. From a network management perspective, this is not optimal and not only complicates the design and implementation, but also wastes network resources and increases the operating cost.

Hence, those skilled in the art are striving to provide a better authentication method for heterogeneous network.

SUMMARY OF THE INVENTION

The above and other problems are solved and an advance in the art is made by systems and methods provided by embodiments in accordance with the invention. A first advantage of embodiments of systems and methods in accordance with the invention is that communication devices in a UE can share security context to authenticate with the core network. This reduces the steps for a UE to authenticate with the core network when one of the communication devices has previously performed a full authentication with the core network. A second advantage of embodiments of systems and methods in accordance with the invention is that the authentication process is improved as the number of interactions is required between the UE and core network is substantially reduced.

The above advantages are provided by embodiments of a system and a method of an authentication framework for a User Equipment (UE) having at least two communication devices to authenticate with a network authentication entity of a core network.

In accordance with an aspect of the disclosure, a (UE) for communicating directly with a core network is provided in the following manner. The UE comprises a first communication device, a second communication device, an authentication management module, a processor, a storage medium, instructions stored on the storage medium and executable by the processor to: perform a first authentication with the core network to obtain a security context, transmit a security context from the authentication management module to at least one of the first and second communication devices, and perform a second authentication for one of the first and second communication devices with the core network using the security context from the authentication management module to establish connection with the core network. In accordance with an embodiment of this disclosure, the instruction further comprises instruction to perform the second authentication by the first communication device with the core network using the security context obtained, in response to dropping connection between the first communication device and the core network.

In accordance with an embodiment of this disclosure, the network management module can be the "supplicant" as in EAP-based authentication framework, which is a known entity for authentication management at a terminal side.

In accordance with an embodiment of this disclosure, the instruction to perform the first authentication with the core network to obtain a security context comprises instructions to instruct the first communication device to: transmit a request for Fast Re-authentication ID to the authentication management module; and receive a response from the authentication management module.

In accordance with an embodiment of this disclosure, the instruction to perform the first authentication with the core network to obtain a security context comprises instructions to instruct the first communication device to: transmit/forward a request to the authentication management module to trigger an authentication procedure; and receive the security context from the authentication management module.

In accordance with an embodiment of this disclosure, the instruction to perform the first authentication with the core network to obtain a security context comprises instructions to, in response to receiving the request from the first communication device, instruct the authentication management module to: retrieve an identity (UE's ID); generate and transmit a request comprising the UE's ID to the core network; and receive an AKA-Challenge message comprising a random number (RAND) and a network authentication token (AUTN), a Fast Re-authentication ID (FRID) and a message authentication code (MAC) generated by the core network.

In accordance with an embodiment of this disclosure, the instruction to perform the first authentication with the core network to obtain a security context comprises instructions to, in response to receiving the AKA-Challenge message, instruct the authentication management module to: verify a validity of the MAC using a key (IK) previously issued to the first communication device; in response to the MAC being valid, compute an authentication vector using an algorithm to obtain parameters such as AUTNUE, RES, and KASME; and determining whether AUTNUE is equal to AUTN.

In accordance with an embodiment of this disclosure, the instruction to perform the first authentication with the core network to obtain a security context comprises instructions to, in response to AUTNUE being equal to AUTN, instruct the authentication management module to: generate a first secret key, k0; establish the security context comprising FRID, k0, and a counter; generate a second secret key, k1, for the first communication device. In accordance with an embodiment of this disclosure, the first secret key is generated by using key derivation functions (KDF) with input comprising UE's ID and RAND (or NONCE received from network) while the second secret key is generated by using key derivation functions (KDF) with input comprising k0 and the counter. In accordance with an embodiment of this disclosure, the second secret key, k1, is generated by using key derivation functions (KDF) with input comprising k0 and RAND (or NONCE received from network).

In accordance with an embodiment of this disclosure, the instruction to perform the first authentication with the core network to obtain a security context further comprises instructions to instruct the authentication management module to: generate and transmit an AKA Response message to the core network, the AKA Response message comprising RES.

In accordance with an embodiment of this disclosure, the instruction to transmit the security context from the authentication management module to at least one of the first and second communication devices comprises instructions to instruct the authentication management module to: receive a request for authentication from the second communication device; and generate and transmit a response to the second communication device containing the Fast Re-authentication ID (FRID).

In accordance with an embodiment of this disclosure, the instruction to perform the second authentication for one of the first and second communication devices with the core network comprises instructions to instruct the second communication device to: generate and transmit a request to the core network containing the UE's ID, FRID and optionally, a flag, the flag comprising an indication that the FRID does not belong to the second communication device; receive an AKA Re-authentication request message from the core network, the AKA Re-authentication request message comprising a counter, a nonce, a new FRID and a MAC; verify the correctness of MAC and the freshness of counter; in response to the MAC being valid, transmit the new FRID as the new Fast Re-authentication ID to the authentication management module and update the local counter with the received counter value plus 1; transmit an AKA-Re-authentication response to the core network, the AKA Re-authentication response message comprises updated counter; receive a result message from the core network indicating that the authentication is successful; generate keys for cellular or non-cellular access; and transmit and receive data with the core network using the keys. In accordance with an embodiment of this disclosure, the received counter is considered fresh if the value is not smaller than the counter stored by the UE. In accordance with another embodiment of this disclosure, the correctness of MAC is determined generating a MAC with the counter, nonce and new FRID using SK and comparing the MAC generated with the MAC received from the core network. In accordance with another embodiment of this disclosure, the authentication management module generates a new security context for the second communication device if the FRID does not belong to the second communication device.

In accordance with another aspect of this disclosure, a User Equipment (UE) for communicating directly with a core network is provided in the following manner. The UE comprises a first communication device, a second communication device, an authentication management module, a processor, a storage medium, instructions stored on the storage medium and executable by the processor to: perform a first authentication by the first communication device with the core network to obtain a security context for the first communication device; transmit partial of the security context from the authentication management module to the second communication device; and perform a second authentication by the second communication device with the core network using the security context from the authentication management module. In accordance with an embodiment of this disclosure, the instructions further comprise instruction to perform the second authentication by the first communication device with the core network using the security context obtained.

In accordance with an embodiment of this disclosure, the instruction to perform the first authentication by the first communication device with the core network to obtain a security context for the first communication device comprises instructions to instruct the first communication device to: transmit a request for Fast Re-authentication ID to the authentication management module; receive a response from the authentication management module.

In accordance with an embodiment of this disclosure, the instruction to perform the first authentication by the first communication device with the core network to obtain a security context for the first communication device comprises instructions to, in response to the response from the authentication management module not containing a Fast Re-authentication ID, instruct the first communication device to: retrieve an identity (UE's ID); generate and transmit a request comprising the UE's ID to the core network; receive an AKA-Challenge message comprising a random number (RAND) and a network authentication token (AUTN), a Fast Re-authentication ID (FRID) and a message authentication code (MAC) generated by the core network.

In accordance with an embodiment of this disclosure, the instruction to perform the first authentication by the first communication device with the core network to obtain a security context for the first communication device comprises instructions to, in response to receiving the AKA-Challenge message, instruct the first communication device to: verify a validity of the MAC using a key (IK) previously issued to the first communication device; in response to the MAC being valid, compute an authentication vector using an AKA algorithm to obtain AUTNUE, RES, and a Key, in one embodiment, the key is KASME; determining whether AUTNUE is equal to AUTN; and in response to AUTNUE being equal to AUTN, derives secret keys for cellular access or non-cellular access.

In accordance with an embodiment of this disclosure, the instruction to perform the first authentication by the first communication device with the core network to obtain a security context for the first communication device further comprises instructions to instruct the first communication device to: transmit the security context to the authentication management module, the security context comprising the FRID, the secret keys, and a counter; and generate and transmit an AKA Response message to the core network, the AKA Response message comprising RES. In accordance with an embodiment of this disclosure, the secret keys are derived using key derivation functions (KDF) with input comprising UE's ID and RAND.

In accordance with an embodiment of this disclosure, the instruction to transmit the security context from the authentication management module to the second communication device comprises instructions to instruct the authentication management module to: receive a request for Fast Re-authentication ID from the second communication device; and generate and transmit a response to the second communication device containing the Fast Re-authentication ID (FRID).

In accordance with an embodiment of this disclosure, the instruction to perform the second authentication by the second communication device with the core network using the security context from the first communication device comprises instructions to, in response to receiving the FRID from the authentication management module, instruct the second communication device to: generate and transmit a request to the core network containing the UE's ID, FRID and a flag, the flag comprising an indication that the FRID does not belong to the second communication device; receive an AKA Re-authentication request message from the core network, the AKA Re-authentication request message comprising a counter, a nonce, a new FRID and a MAC; verify the correctness of MAC and the freshness of counter; in response to the MAC being valid, transmit the new FRID as the new Fast Re-authentication ID to the authentication management module and update the local counter with the received counter value plus 1; transmit an AKA-Re-authentication response to the core network, the AKA Re-authentication response message comprises updated counter; receive a result message from the core network indicating that the authentication is successful; generate keys for cellular or non-cellular access; and transmit and receive data with the core network using the keys. In accordance with an embodiment of this disclosure, the received counter is considered fresh if the value is not smaller than the counter stored by the UE. In accordance with an embodiment of this disclosure, the correctness of MAC is determined generating a MAC with the counter, nonce and new FRID using SK and comparing the MAC generated with the MAC received from the core network.

In accordance with another aspect of this disclosure, a User Equipment (UE) for communicating directly with a core network is provided in the following manner. The UE comprises a first communication device, a second communication device, a processor, a storage medium, instructions stored on the storage medium and executable by the processor to: perform a first authentication by the first communication device with the core network to obtain a security context for the first communication device; transmit the security context from the first communication device to the second communication device; and perform a second authentication by the second communication device with the core network using the security context from the first communication device. In accordance with an embodiment of this disclosure, the instructions further comprises instruction perform the second authentication by the first communication device with the core network using the security context obtained, in response to dropping connection between the first communication device and the core network.

In accordance with an embodiment of this disclosure, the instruction to perform the first authentication by the first communication device with the core network to obtain a security context for the first communication device comprises instructions to instruct the first communication device to: transmit a request for Fast Re-authentication ID to the second communication device; receive a response from the second communication device.

In accordance with an embodiment of this disclosure, the instruction to perform the first authentication by the first communication device with the core network to obtain a security context for the first communication device comprises instructions to, in response to the response from the second communication device not containing a Fast Re-authentication ID, instruct the first communication device to: retrieve an identity (UE's ID); generate and transmit a request comprising the UE's ID to the core network; receive an AKA-Challenge message comprising a random number (RAND) and a network authentication token (AUTN), a Fast Re-authentication ID (FRID) and a message authentication code (MAC) generated by the core network; verify a validity of the MAC using a key (IK) previously issued to the first communication device; in response to the MAC being valid, compute an authentication vector using an AKA algorithm to obtain AUTNUE, RES, and KASME; determining whether AUTNUE is equal to AUTN, in response to AUTNUE being equal to AUTN, derives secret keys for cellular access or non-cellular access; store the security context comprising the FRID, the secret keys, and a counter; and generate and transmit an AKA Response message to the core network, the AKA Response message comprising RES. In accordance with an embodiment of this disclosure, the secret keys are derived using key derivation functions (KDF) with input comprising UE's ID and RAND.

In accordance with an embodiment of this disclosure, the instruction to transmit the security context from the first communication device to the second communication device comprises instructions to instruct the first communication device to: receive a request for Fast Re-authentication ID from the second communication device; and generate and transmit a response to the second communication device containing the Fast Re-authentication ID (FRID).

In accordance with an embodiment of this disclosure, the instruction to perform the second authentication by the second communication device with the core network using the security context from the first communication device comprises instructions to, in response to receiving the FRID from the first communication device, instruct the second communication device to: generate and transmit a request to the core network containing the UE's ID, FRID and a flag, the flag comprising an indication that the FRID does not belong to the second communication device; receive an AKA Re-authentication request message from the core network, the AKA Re-authentication request message comprising a counter, a nonce, a new FRID and a MAC; verify the correctness of MAC and the freshness of counter; in response to the MAC being valid, store the new FRID as the new Fast Re-authentication ID in the security context and update the local counter with the received counter value plus 1; transmit an AKA-Re-authentication response to the core network, the AKA Re-authentication response message comprises updated counter; receive a result message from the core network indicating that the authentication is successful; generate keys for cellular or non-cellular access; and transmit and receive data with the core network using the keys. In accordance with an embodiment of this disclosure, the received counter is considered fresh if the value is not smaller than the counter stored by the UE. In accordance with an embodiment of this disclosure, the correctness of MAC is determined generating a MAC with the counter, nonce and new FRID using SK and comparing the MAC generated with the MAC received from the core network.

In accordance with another aspect of this disclosure, an authentication method for a User Equipment having a first communication device and a second communication device to authenticate with a network authentication entity of a core network is provided in the following manner. The authentication method first authenticates between the first communication device and the network entity via a first authentication process to obtain a security context. Subsequently, the authentication method transmits the security context information to the second communication device. Therefore, authentication method authenticates between the second communication device and the network authentication entity via a second authentication process, the second communication device authenticating with the network authentication entity using the security context from the first communication device. In accordance with an embodiment of this disclosure, in response to dropping connection between the first communication device and the core network, authenticating between the first communication device and the network entity via the second authentication process using the portion of the security context.

In accordance with another aspect of this disclosure, an authentication framework for a User Equipment having at least two communication devices to authenticate with a network authentication entity of a core network is provided in the following manner. The authentication framework performs a first authentication by the first communication device of the UE with the network authentication entity to obtain a security context for the first communication device. Subsequently, the security context is transmitted to the second communication device. The second communication device then performs a second authentication with the core network using the security context from the first communication device. In accordance with an embodiment of this disclosure, in response to dropping connection between the first communication device and the core network, performing the second authentication by the first communication device with the core network using the security context obtained.

In accordance with another aspect of this disclosure, a network authentication entity in a core network for authenticating with User Equipment (UE) is provided in the following manner. The network authentication entity comprises a processor, a storage medium, and instructions stored on the storage medium and executable by the respective processor to: perform a first authentication with a first communication device of the UE to generate a security context through the authentication procedure with the first communication device; and perform a second authentication with a second communication device pf the UE based on the security context established through the authentication procedure with the first communication device of the UE.

In accordance with another aspect of this disclosure, the network authentication entity can be the authentication server in the EAP-based authentication framework. In some specifications, it is also known as Authentication Unit (AU) or Control Plane Authentication Unit (CP-AU).

In accordance with an embodiment of this disclosure, the network authentication entity establishes a security context through the authentication with the authentication management module via the first or the second communication device at UE side. The security context at the network authentication entity includes at least the UE's ID, a counter and secret key, denoted as k0. The network authentication entity derive secret key based on the k0 and transmit the key, denoted as k1, to the base station or Wi-Fi AP through which the UE and network authentication entity authenticate with each other. In accordance with an embodiment of this disclosure, the first secret key is generated by using key derivation functions (KDF) with input comprising UE's ID and RAND (or NONCE received from network) while the second secret key is generated by using key derivation functions (KDF) with input comprising k0 and the counter. In accordance with an embodiment of this disclosure, the second secret key, k1, is generated by using key derivation functions (KDF) with input comprising k0 and RAND (or NONCE received from network). In accordance with an embodiment of this disclosure, the first secret key is stored on the network authentication entity and the second secret key is transmitted to the network entity such as base station or Wi-Fi AP.

In accordance with an embodiment of this disclosure, the instruction to perform the first authentication with a first communication device of the UE to generate a security context for the first communication device comprises instructions to: receive a Request message containing a UE's ID from the UE via either the base station or Wi-Fi AP; generate and transmit an Authentication Data Request to a Home Subscriber Server (HSS), the Authentication Data Request includes UE's ID, SN ID, and network type; receive an Authentication Data Response from the HSS, the Authentication Data Response comprising a random number (RAND), AUTN, XRES, IK, and CK; generate a Fast Re-authentication ID (FRID). In accordance with an embodiment of this disclosure, the FRID is generated by combining the UE's ID with a random number. In accordance with another embodiment of this disclosure, the FRID is generated by combining the UE's ID with a pre-determined number based on the type of the communication device making the request.

In accordance with an embodiment of this disclosure, the instruction to perform the first authentication with a first communication device of the UE to generate a security context for the first communication device further comprises instructions to: generate and transmit an AKA-Challenge message containing the FRID, RAND, AUTH, and a message authentication code (MAC) to the base station or the Wi-Fi AP depending on which of the communication device initiate the authentication process, wherein the MAC is generated using IK with input parameters of MAC including FRID, RAND, AUTH, and can be expressed in the following manner, MAC=MAC IK(FRID||RAND||AUTH).

In accordance with an embodiment of this disclosure, the instruction to perform the first authentication with a first communication device of the UE to generate a security context for the first communication device further comprises instructions to: receive an AKA response from the UE comprising RES; determine whether RES is equal to XRES; in response to RES being equal to XRES, derive a secret key, k0, for the first communication device; and store the security context comprising the FRID, k0, and a counter. In accordance with an disclosure, the secret key is derived using key derivation functions (KDF) with inputs of KDFs including UE's ID and RAND.

BRIEF DESCRIPTION OF THE DRAWINGS

The above advantages and features in accordance with this invention are described in the following detailed description and are shown in the following drawings.

DETAILED DESCRIPTION

This invention relates to a method and system a unified authentication framework for collaborative authenticating of mobile devices to access a core network. Particularly, this invention relates to a method and system a unified authentication framework for collaborative authenticating between a mobile device and a core network.

In this disclosure, it is proposed that a new authentication solution that optimizes the authentications framework for the communication network when different access technologies such as 5G and Wi-Fi are used in the next generation communication network.

In order to better understand the new authentication solution, a brief overview of the existing authentication method would be described first.

Figure 1:
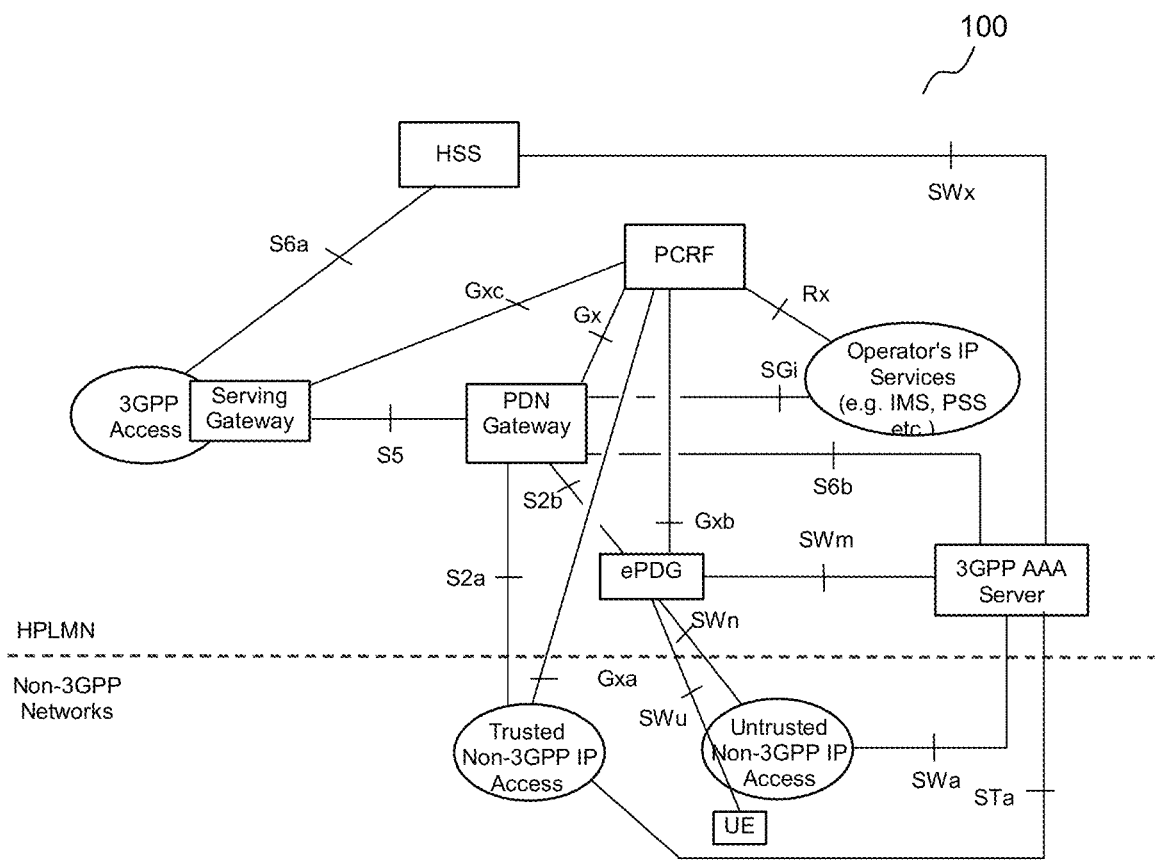
FIG. 1 illustrating a network architecture that integrates the Wi-Fi access technology, including both trusted and untrusted Wi-Fi.
Figure 2:
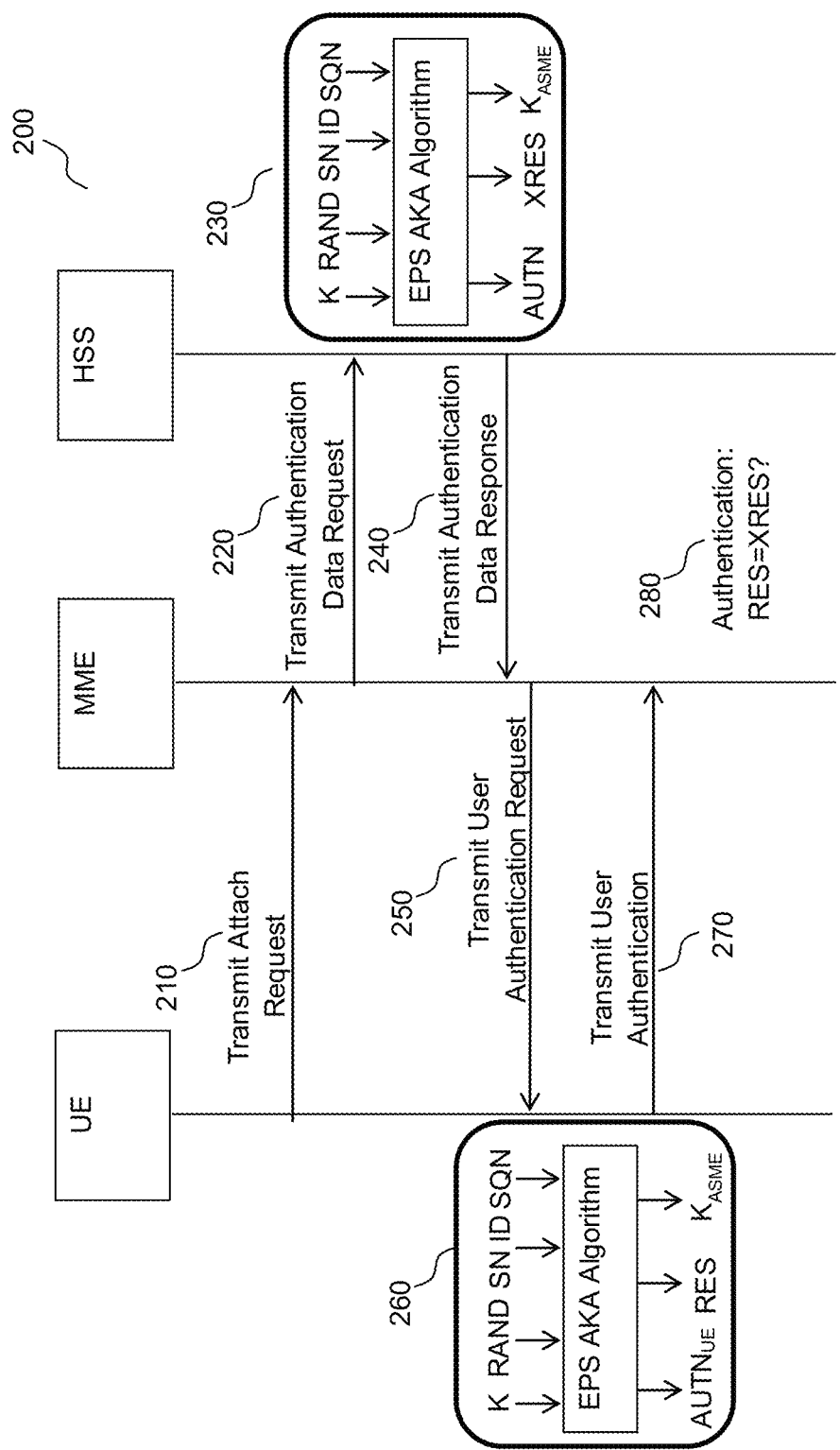
FIG. 2 illustrating a timing diagram of a procedure of the EPS-AKA protocol in 4G network where a UE performs a mutual authentication with the network to access the network via LTE technology.

FIG. 2 illustrates a timing diagram 200 of the procedure of the EPS-AKA protocol in 4G network where a UE performs a mutual authentication with the network to access the network via LTE technology. Timing diagram 200 begins with 210 where the UE transmits an Attach Request to the MME. The Attach Request comprises Access ID of the UE.

Upon receipt of the Attach Request from the UE, the MME transmits an Authentication Data Request to the HSS in step 220. The Authentication Data Request includes the Access ID, the Serving Network Identity (SN ID), and the Network Type.

In response to receiving the Authentication Data Request from the MME, the HSS locates a key (K) associated to the Access ID in the HSS database, and computes the authentication vector using EPS AKA algorithm in step 230. The authentication vector includes a Random number (RAND), AUTN, KAMSE and XRES. The HSS then generates and transmits an Authentication Data Response with the authentication vectors to the MME in step 240.

In step 250, the MME generates and transmits a User Authentication Request to the UE. The User Authentication Request includes the random number (RAND), and the authentication token AUTN derived from the authentication vector.

Upon receipt of the RAND and AUTN, the UE computes AUTNUE and then authenticates the core network by verifying whether AUTNUE is equal to AUTN in step 260. If AUTNUE is equal to AUTN, the UE transmits the User Authentication Response to the MME in step 270. The User Authentication Response includes RES.

Upon receipt of the User Authentication Response, the MME authenticates UE by comparing RES and XRES in step 280. If RES is equal to XRES, authentication is successful and the MME grants the UE access to the gateways. Timing diagram 200 ends after step 280.

Figure 3:
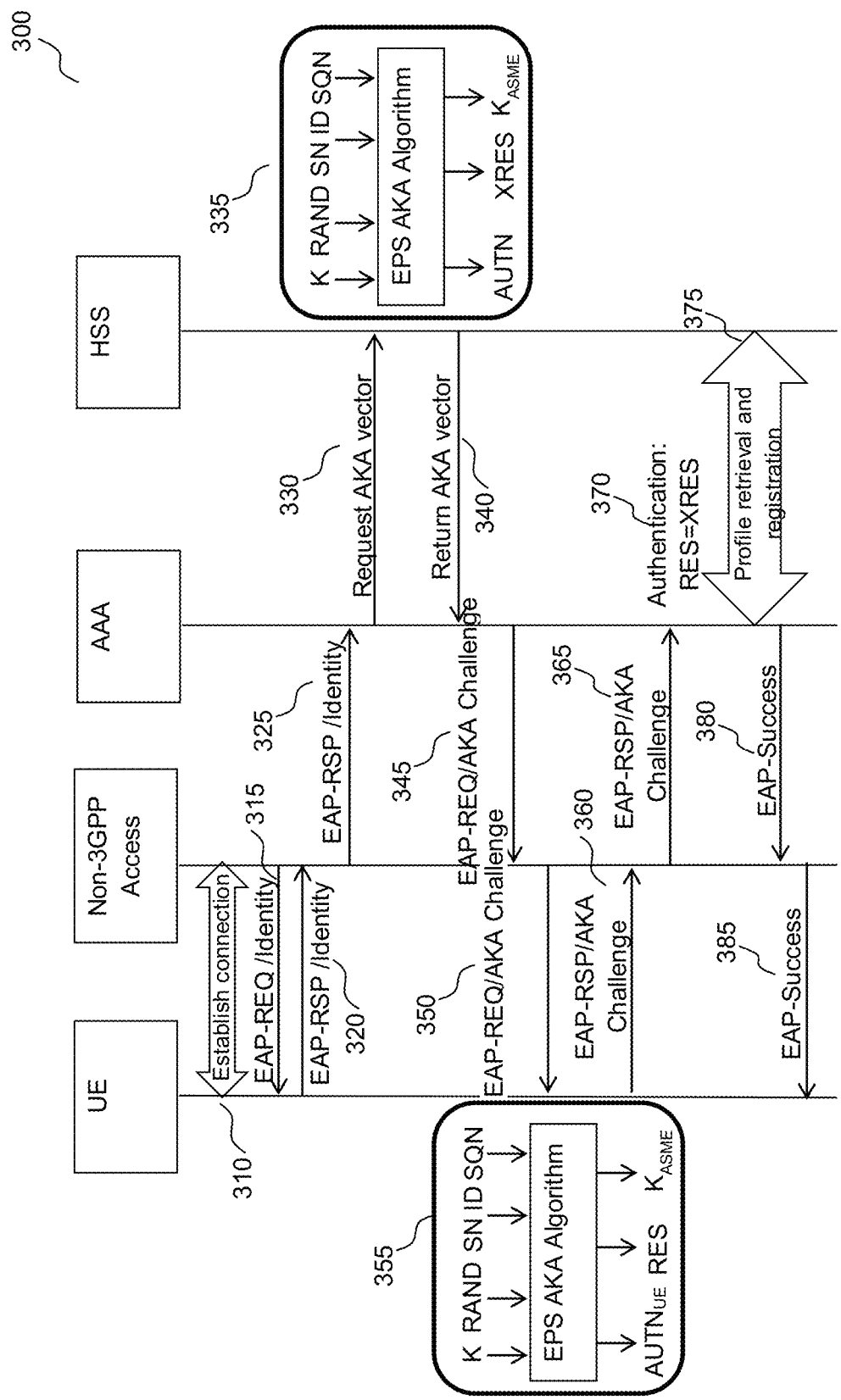
FIG. 3 illustrating a timing diagram of a procedure of the EAP-AKA protocol in 4G network where a UE performs a mutual authentication with the network to access the network via Wi-Fi technology.

FIG. 3 illustrates a timing diagram 300 of the procedure of the EAP-AKA/EAP-AKA' protocol in 4G network where a UE performs a mutual authentication with the network to access the network via Wi-Fi technology. Timing diagram 300 begins with 310 where the UE associates with a Non-3GPP Access Point such as a Wi-Fi AP. After the UE associates with the Wi-Fi AP, the Wi-Fi AP transmits a request for identity to the UE in step 315. Upon receipt of the request, the UE retrieves its identity and transmit the identity to the Wi-Fi AP in step 320. In response to receiving the identity from the UE, the Wi-Fi AP transmits the identity to the AAA server in step 325.

In step 330, the AAA transmits a request for AKA vector to the HSS. In response to receiving the request from the AAA, the HSS locates a key (K) associated to the identity in the HSS database, and computes the authentication vector using EAP AKA algorithm in step 335. The authentication vector includes a Random number (RAND), AUTN, KAMSE and XRES. The HSS then generates and transmits the authentication vectors to the AAA in step 340.

After the AAA receives the authentication vector from the HSS, the AAA generates and transmits a challenge message to the Wi-Fi AP in step 345. The Wi-Fi AP in response to receiving the challenge message, transmits the challenge message to the UE in step 350.

In step 355, the UE authenticates the network based on the challenge message. Particularly, the UE computes AUTNUE and then authenticates the core network by verifying whether AUTNUE is equal to AUTN. If AUTNUE is equal to AUTN, the UE transmits a response message to the Wi-Fi AP in step 360. The User Authentication Response includes RES.

In response to receiving the response message from the UE, the Wi-Fi AP transmits the response message to the AAA server in step 365. Upon receipt of the response message, the AAA authenticates the UE by comparing RES and XRES in step 370. If RES is equal to XRES, authentication is successful and the AAA would communicate with the HSS for profile retrieval and registration in step 375. The AAA would also grant the UE access to the gateways upon successful authentication in step 370.

The AAA then generates and transmits a success message to the Wi-Fi AP in step 380. The Wi-Fi AP in response to receiving the success message from the AAA, transmits the success message to the UE in step 385. Timing diagram 300 ends after step 385.

Figure 4:
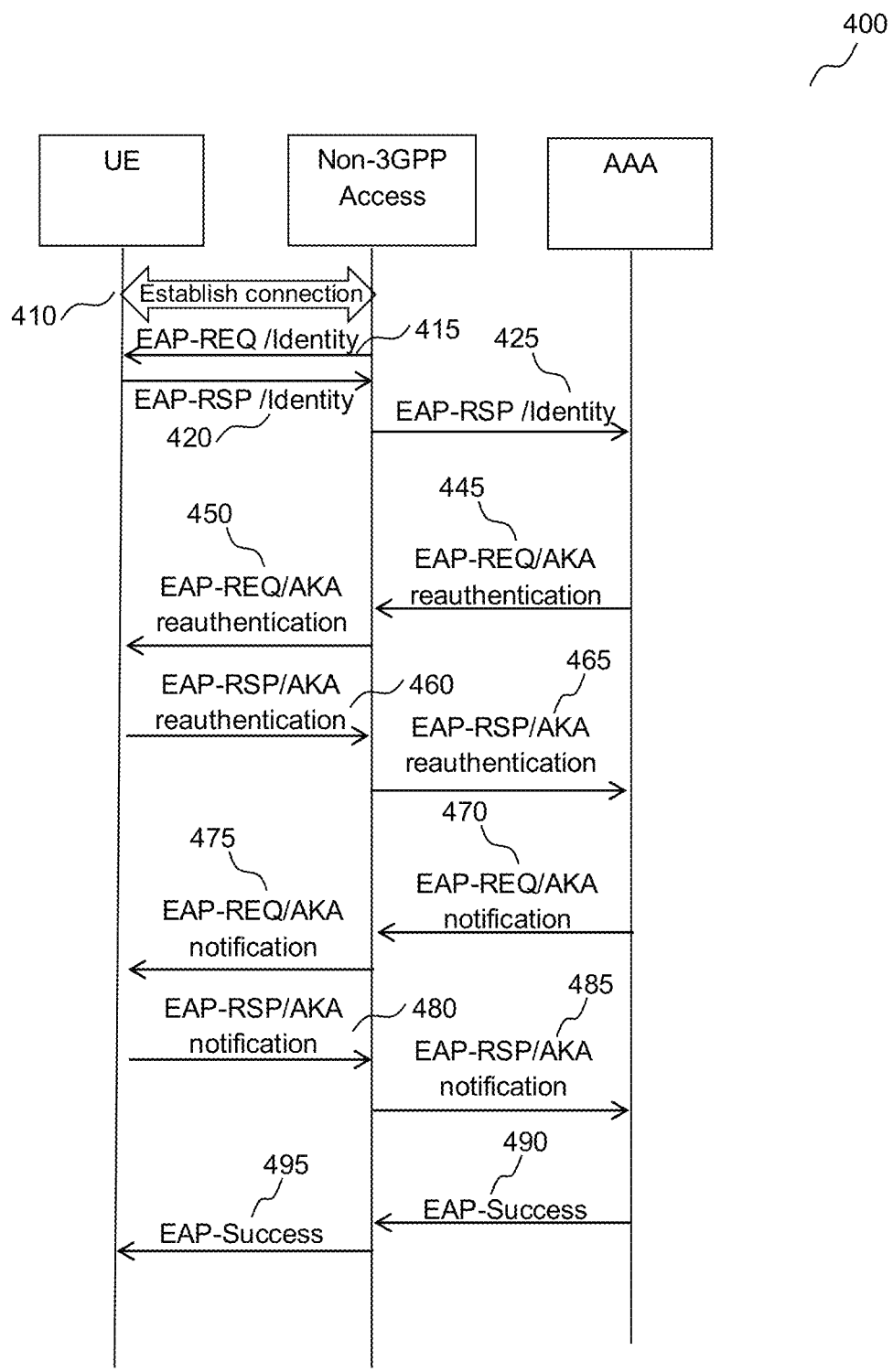
FIG. 4 illustrating a timing diagram of a procedure of a Fast Re-authentication mechanism to accelerate authentication presented in the 3GPP specification 33.402.

FIG. 4 illustrates a timing diagram 400 of the procedure of a Fast Re-authentication mechanism to accelerate authentication presented in the 3GPP specification 33.402 version 13.0.0. Timing diagram 400 begins with 410 where the UE associates with a Non-3GPP Access Point such as a Wi-Fi AP. After the UE associates with the Wi-Fi AP, the Wi-Fi AP transmits a request for identity to the UE in step 415. Upon receipt of the request, the UE retrieves its identity and transmit the identity to the Wi-Fi AP in step 420. In response to receiving the identity from the UE, the Wi-Fi AP transmits the identity to the AAA server in step 425.

In step 445, the AAA generates and transmits a re-authentication message to the Wi-Fi AP. The Wi-Fi AP in response to receiving the re-authentication message, transmits the re-authentication message to the UE in step 450. The re-authentication message includes COUNTER, NONCE_S (encrypted), NEXT REAUTH ID (encrypted), MAC. This is a known method and further details can be found in section 5.4 of RFC4187.

In step 460, the UE transmits a response message to the Wi-Fi AP. The response message includes COUNTER with same value (encrypted) and MAC.

In response to receiving the response message from the UE, the Wi-Fi AP transmits the response message to the AAA server in step 465. Upon receipt of the response message, the AAA generates and transmits a notification message to the Wi-Fi AP in step 470. The notification message includes COUNTER with same value (encrypted) and MAC.

The Wi-Fi AP in response to receiving the notification message, transmits the notification message to the UE in step 475. In step 480, the UE generates and transmits a second response message to the Wi-Fi AP in response to receiving the notification message.

The Wi-Fi AP in response to receiving the second response message, transmits the second response message to the UE in step 485.

The AAA then generates and transmits a success message to the Wi-Fi AP in step 490. The Wi-Fi AP in response to receiving the success message from the AAA, transmits the success message to the UE in step 495. Timing diagram 400 ends after step 495.

Comparing Fast re-authentication as shown in FIG. 4 with the normal EAP-AKA' full authentication procedure as shown in FIG. 3, the AAA server does not need to get Authentication Vectors from the HSS. Hence, the Fast re-authentication procedure is more efficient than the normal EAP-AKA' full authentication. One skilled in the art will recognize that the process flow as described above with reference to FIGS. 2-4 are existing processes. Hence, the above description is not meant to be exhaustive.

With the background in mind, we shall now turn to the invention. In this disclosure, it is assumed that in the next generation wireless communication network such as the 5th Generation (5G) communication network, both the cellular and Wi-Fi technologies, may use the same authentication protocol, EAP-AKA', instead of EPS-AKA and EAP-AKA' as in the 4G network. However, it is noted that this disclosure is not restricted to the use of only one authentication protocol.

Furthermore, at the network side, only one authentication entity, the AAA server, may be used instead of having separate authentication entities, i.e. MME and AAA, in the 4G network. Alternatively, the MME and AAA may be managed by an authentication server.

Based on such a configuration, it is proposed that a method and system for different access technologies to share the authentication results be provided. Particularly, after one access technology of the UE successfully authenticates with the AAA server, the UE obtains a fast authentication ID. The second access technology can acquire the fast authentication ID and perform a fast authentication with the AAA server, instead of performing a full authentication as the existing technologies.

For purposes of this disclosure, it is typical that a UE such as a mobile device contains more than one access technology. LTE and Wi-Fi represents two typical wireless access technologies. The two technologies are also fusing gradually. In the 4G networks, the two access technologies authenticate with network with same credential preserved in the USIM and HSS respectively, but the underlying authentication protocols and authentication entities are still different. The cellular entity and Wi-Fi entity do not speak to each other. Instead, a managing module is provided to determine the use of either one of the access technology.

Figure 5:
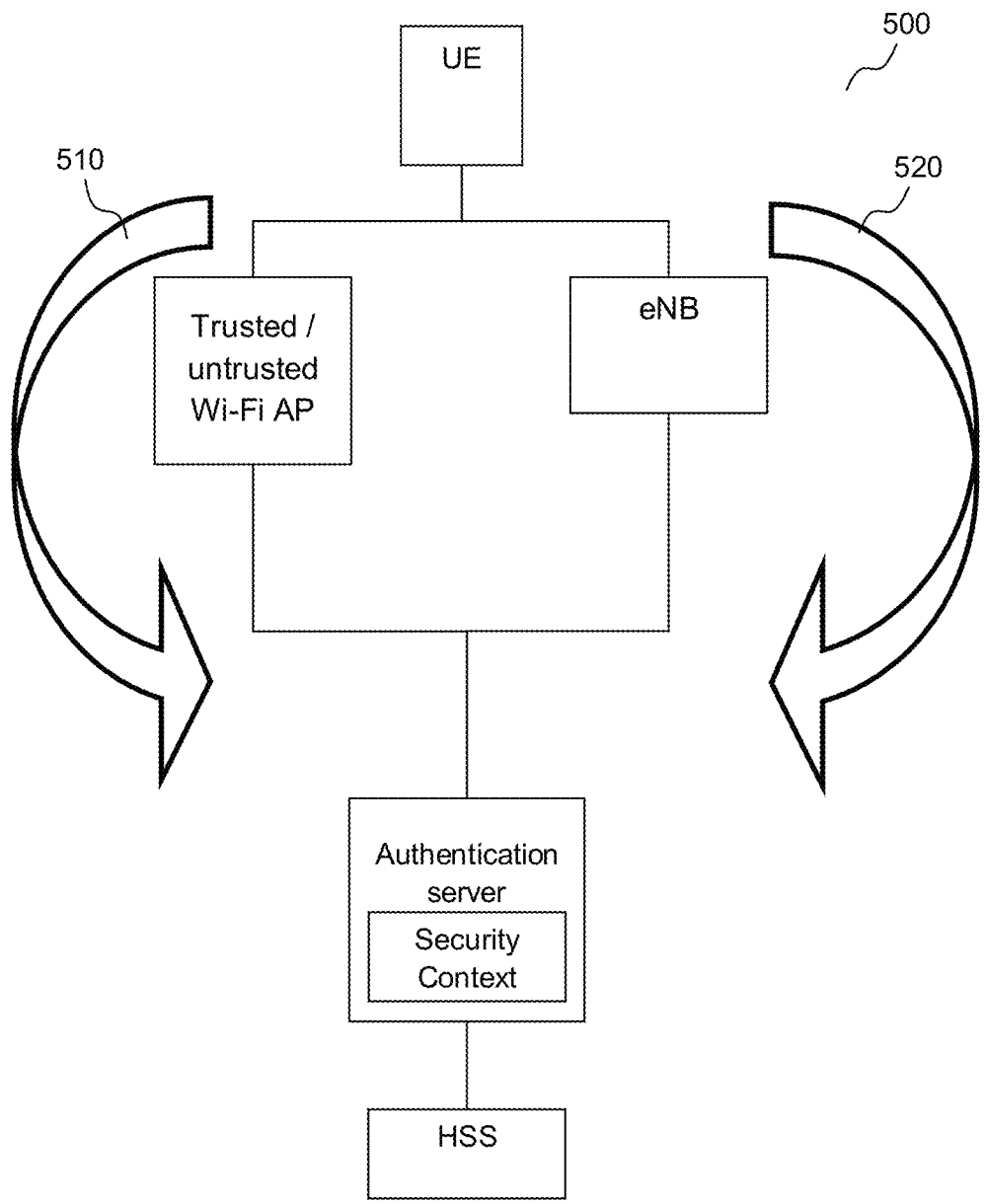
FIG. 5 illustrating a unified authentication framework for the 5G and Wi-Fi access technologies in accordance with an embodiment of this disclosure.

FIG. 5 illustrates a unified authentication framework for the 5G and Wi-Fi access technologies. With the proposed framework, independent from the access technology, only one authentication protocol, EAP-AKA', is used for authentication, and there is only one authentication entity at the network side, i.e., the AAA server.

With the proposed new authentication framework, the proposed methods for different access technologies belonging to the same UE share the authentication information so that the authentication procedure can be further optimized. In this disclosure, various methods are proposed. The first method is that the UE with one wireless access technology gets fast authentication information directly from the other devices with different access technology. The second method relates to an independent module such as an authentication management module to manage the authentication information such as the fast authentication ID. This allows the UE to obtain authentication information from the authentication management module.

Essentially, the unified authentication framework consists of two parts 510 and 520. The first part 510 pertains to a first access technology in a UE authenticating with the core network to obtain certain security context. The second part pertains to a second access technology in the UE obtaining part of the security context established through the first access technology to authenticate with the core network. In the illustration as shown in FIG. 5, the first access technology is Wi-Fi access technology while the second access technology is cellular technology. However, one skilled in the art will recognize that the first and second access technologies are interchangeable without departing from the disclosure. In other words, FIG. 5 may be modified such that the first access technology is cellular technology while the second access technology is Wi-Fi access technology without departing from the disclosure.

It is noted that the UEs and core network are widely known. Hence, for brevity, the operating systems, configurations, structures, assemblies, etc. are omitted. Importantly, the method and system in accordance with the invention is provided in the form of instructions stored on storage medium and executable by processors of respective UE and core networks.

UE with Two Communication Modules

In the first method of the unified authentication framework, two communication entities/devices within the same UE share authentication information, including fast re-authentication ID and related secret keys, among each other directly. The procedure for the two communication entities/devices using shared authentication will now be described below with reference to FIG. 6.

Figure 6:
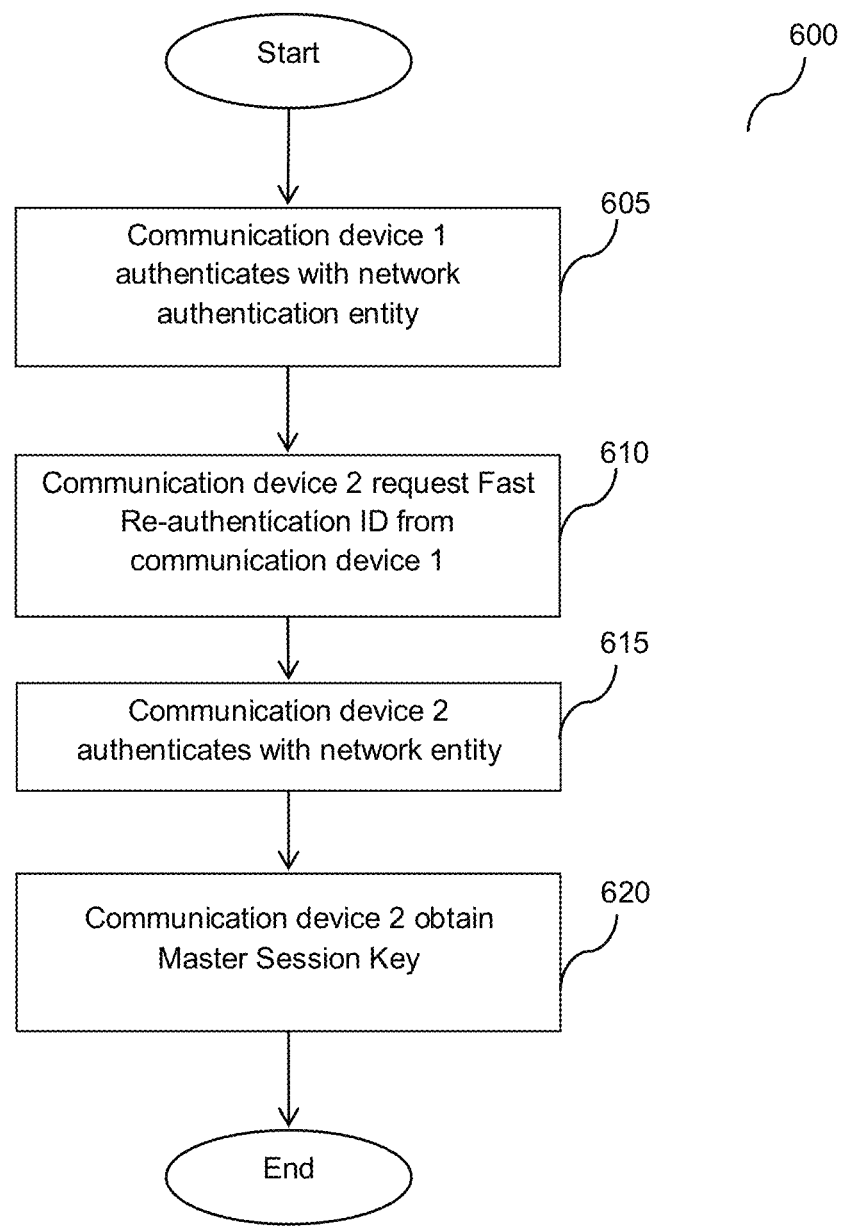
FIG. 6 illustrating a process on a procedure for two communication entities/devices using shared authentication information to authenticate with a core network in accordance with an embodiment of this disclosure.

FIG. 6 illustrates a process 600 on a procedure for two communication entities/devices using shared authentication information to authenticate with a core network. Process 600 begins with step 605 where communication device 1 authenticates with the network authentication entity of the core network to obtain a security context. Particularly, the communication device 1 of the UE authenticates with the network authentication entity of the core network and if successful, the network authentication entity generates a security context. In this instance, the network authentication entity may be the AAA server, MME or an independent security management module, which can be co-located with AAA and MME servers. The security context may include Fast Re-authentication ID, secret keys, and a counter. An authentication message is then transmitted to the communication device 1. One skilled in the art will recognize that the communication device 1 may generate the security context instead without departing from the disclosure. Step 605 pertains to the first part of the unified authentication framework. Further details of step 605 will be described below with reference to FIG. 15.

In step 610, communication device 2 wishes to authenticate with the core network. However, prior to authenticating with the core network, communication device 2 transmits a request to communication device 1 to obtain the Fast Re-authentication ID.

In step 615, upon receiving the Fast Re-authentication ID from the communication device 1, the communication device 2 uses the Fast Re-authentication ID to authenticate with the core network later. Particularly, the communication device 2 starts a Fast Re-authentication procedure with the core network. The Fast Re-authentication procedure begins with the communication device 2 generating and transmitting a message to the authentication entity. The message includes the Fast Re-authentication ID, and optionally, also including a flag to indicate that the Fast Re-authentication ID does not belong to the current communication device and that the current communication device obtains the Fast Re-authentication ID from another device within the same UE. By extracting the flag from the message, the authentication entity at the network side determines an appropriate action in handling the security context. For example, if the flag indicates that the Fast Re-authentication ID belongs to the communication device, then the server may simple update the security context. If the flag indicates that the fast re-authentication ID does not belong to the communication device, the authentication entity may create a new security context.

The network authentication entity may request for further information from the communication device 2 during authentication. Hence, the communication device 2 may request for certain information from the communication device 1. For example, after receiving the Fast Re-authentication message embedded in the EAP-AKA' Request from the network authentication entity, the communication device 2 may send the Fast Re-authentication message to the communication device 1. The communication device 1 would then generate a Fast Re-authentication response and transmit the Fast Re-authentication response to the communication device 2. The communication device 2 then transmits the Fast Re-authentication response message to the network authentication entity at the network side. The network authentication entity authenticates the communication device 2 with the Fast Re-authentication response message. Further, other messages such notification and success message may be exchanged between the second device and the authentication entities at the network side. Further details of step 615 will be described below with reference to FIG. 16.

In step 620, if the network authentication entity determines that the Fast Re-authentication ID does not belongs to communication device 2 and authentication with communication device 2 is successful, the network authentication entity generates a security context for communication device 2. The security context includes at least a master session key. The security context is transmitted to communication device 2. Alternatively, the Master Session Key may be generated by the communication device 1 and transmitted to communication device 2. Steps 610, 615 and 620 pertain to the second part of the unified authentication framework. Process 600 ends after 620.

Figure 7:
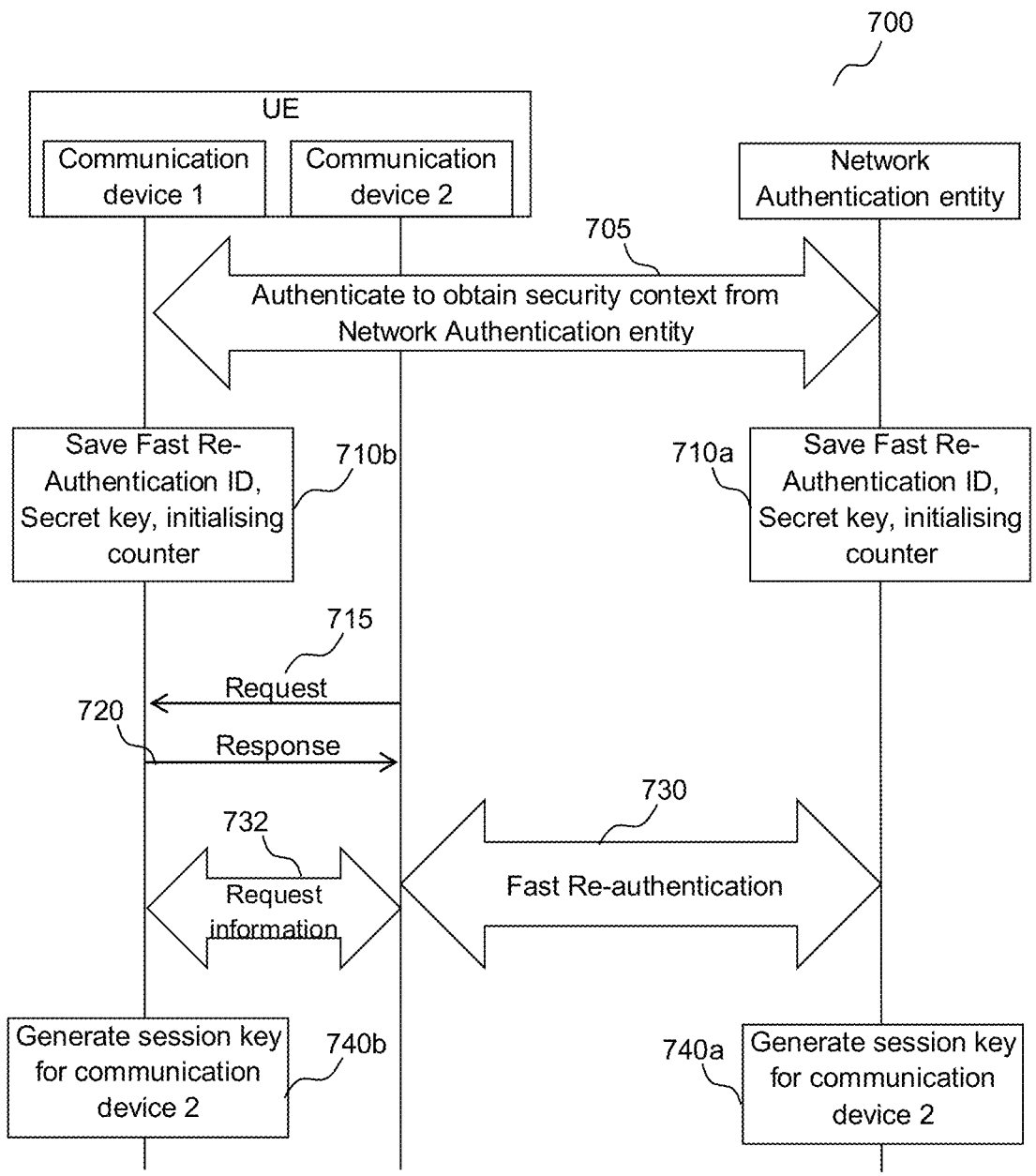
FIG. 7 illustrating a timing diagram on the procedure for two communication entities/devices using shared authentication information to authenticate with the core network in accordance with an embodiment of this disclosure.

FIG. 7 illustrates a timing diagram 700 on the procedure for two communication entities/devices using shared authentication information to authenticate with the core network as shown in FIG. 6. Timing diagram 700 begins with step 705 where communication device 1 authenticates with the network authentication entity of the core network to obtain a security context. Similar to step 605 in process 600, the communication device 1 of the UE authenticates with the network authentication entity of the core network and if successful, the network authentication entity generates a security context. In this instance, the network authentication entity may be the AAA server, MME server or a security management module within or outside of the AAA and MME servers. The security context may include Fast Re-authentication ID, secret keys, and a counter. A message including the Fast Re-authentication ID, a counter and other information is then transmitted to the communication device 1. One skilled in the art will recognize that the communication device 1 may generate the security context instead without departing from the disclosure. Further details of step 705 will be described below with reference to FIG. 15.

After authentication is successful in step 705, the network authentication entity saves the Fast Re-authentication ID, secret keys, and initializes a counter in step 710*a*. Similarly, at the UE end, the communication device 1 also saves the Fast Re-authentication ID, secret keys, and initializes a counter in step 710*b*. Steps 705, 710*a* and 710*b* pertain to the first part of the unified authentication framework.

In step 715, communication device 2 wishes to authenticate with the core network. To do so, communication device 2 transmits a request to communication device 1 to obtain the Fast Re-authentication ID. In response to the request from communication device 2, communication device transmits a response containing the Fast Re-authentication ID to the communication device 1 in step 720.

In step 730, upon receiving the Fast Re-authentication ID from the communication device 1, the communication device 2 uses the Fast Re-authentication ID to authenticate with the core network. Particularly, the communication device 2 starts a Fast Re-authentication procedure with the network authentication entity of the core network. The Fast Re-authentication procedure begins with the communication device 2 generating and transmitting a message to the authentication entity. The message includes the Fast Re-authentication ID and a flag to indicate that the Fast Re-authentication ID does not belong to the current communication device and that the current communication device obtains the Fast Re-authentication ID from another device within the same UE. By extracting the flag from the message, the authentication entity at the network side determines an appropriate action in handling the security context. For example, if the flag indicates that the Fast Re-authentication ID belongs to the communication device, then the server may simple update the security context. If the flag indicates that the fast re-authentication ID does not belong to the communication device, the authentication entity may create a new security context.

During step 730, the network authentication entity may request for further information from the communication device 2. Hence, the communication device 2 may request for certain information from the communication device 1 in step 732. For example, after receiving the Fast Re-authentication message embedded in the EAP-AKA' Request from the network authentication entity, the communication device 2 may send the Fast Re-authentication message to the communication device 1. The communication device 1 would then generate a Fast Re-authentication response and transmit the Fast Re-authentication response to the communication device 2. The communication device 2 then transmits the Fast Re-authentication response message to the network authentication entity at the network side. The network authentication entity authenticates the communication device 2 with the Fast Re-authentication response message. Further, other messages such notification and success message may be exchanged between the second device and the authentication entities at the network side. Further details of step 615 will be described below with reference to FIG. 16.

In step 740*a*, if the network authentication entity determines that the Fast Re-authentication ID does not belongs to communication device 2 and authentication with communication device 2 is successful, the network authentication entity generates a security context for communication device 2. The security context includes at least a master session key. Authentication messages including a new fast re-authentication ID, a counter and nonces are transmitted to communication device 2 for security context derivation. Alternatively, the Master Session Key may be generated by the communication device 1 and transmitted to communication device 2 in step 740*b*. Steps 730, 732, 740*a* and 740*b* pertain to the second part of the unified authentication framework. Timing diagram 700 ends after step 740a or 740b.

Figure 8:
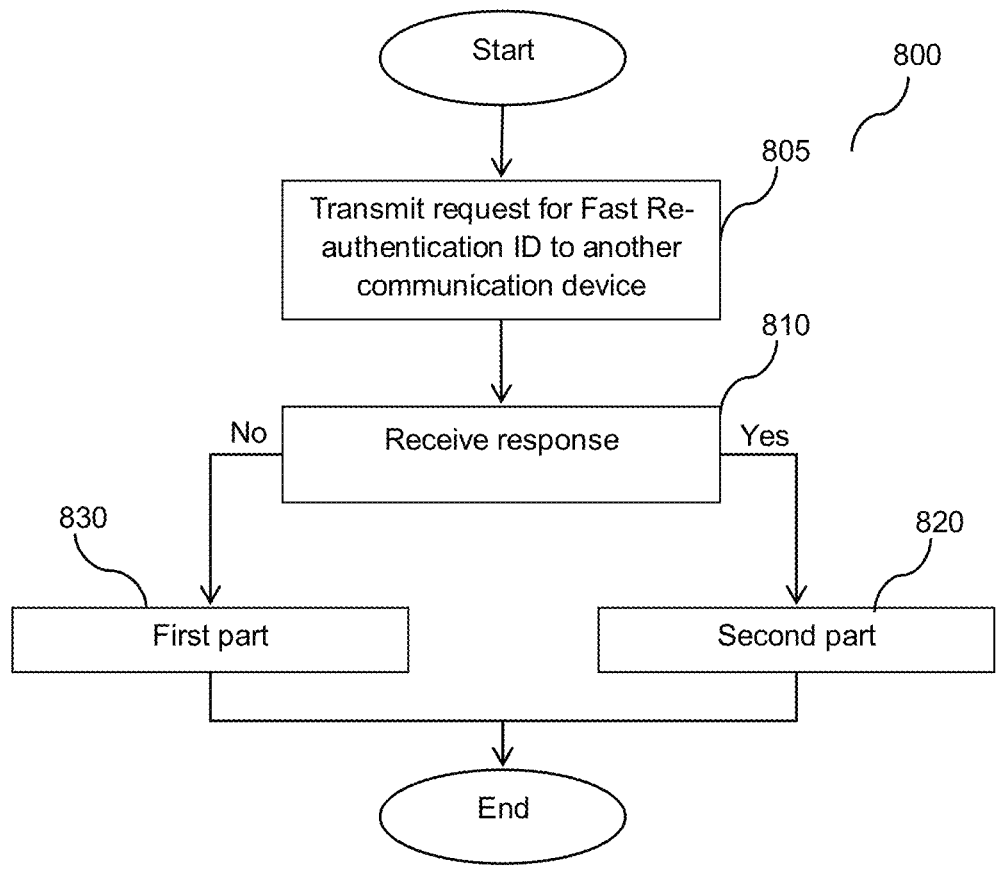
FIG. 8 illustrating a process performed by the first communication device in accordance with process 600 and timing diagram 700 in accordance with an embodiment of this disclosure.

FIG. 8 illustrates a process 800 performed by the communication device 1 in accordance with process 600 and timing diagram 700. Process 800 begins with step 805 by transmitting a request for Fast Re-authentication ID to the second communication device of the UE. In step 810, the first communication device receives a response from the second communication device. If the response contains a Fast Re-authentication ID, the communication device proceeds to step 820. If the response does not contain a Fast Re-authentication ID, the communication device proceeds to step 830.

In step 820, the first communication device proceeds with second part of the unified authentication framework. In step 830, the first communication device proceeds with first part of the unified authentication framework. Process 800 ends after step 820 or 830.

Figure 9:
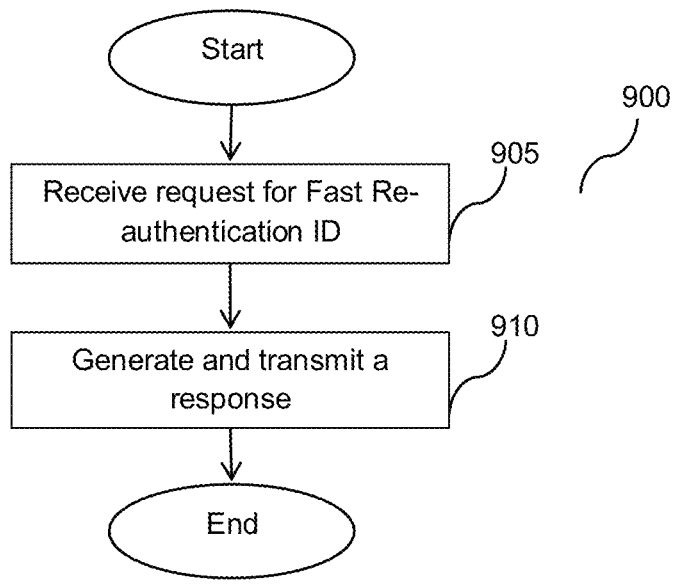
FIG. 9 illustrating a process performed by the communication device 2 in accordance with process 600 and timing diagram 700 in accordance with an embodiment of this disclosure.

FIG. 9 illustrates a process 900 performed by the communication device 2 in accordance with process 600 and timing diagram 700. Process 900 begins with step 905 by receiving a request for Fast Re-authentication ID from the communication device 1 of the UE.

In step 910, the communication device 2 generates and transmits a response containing the Fast Re-authentication ID, secret key and counter. If communication device 2 does not have the Fast Re-authentication ID, communication device 2 generates and transmits a response indicating that it does not have a Fast Re-authentication ID.

Process 900 ends after step 910.

Figure 10:
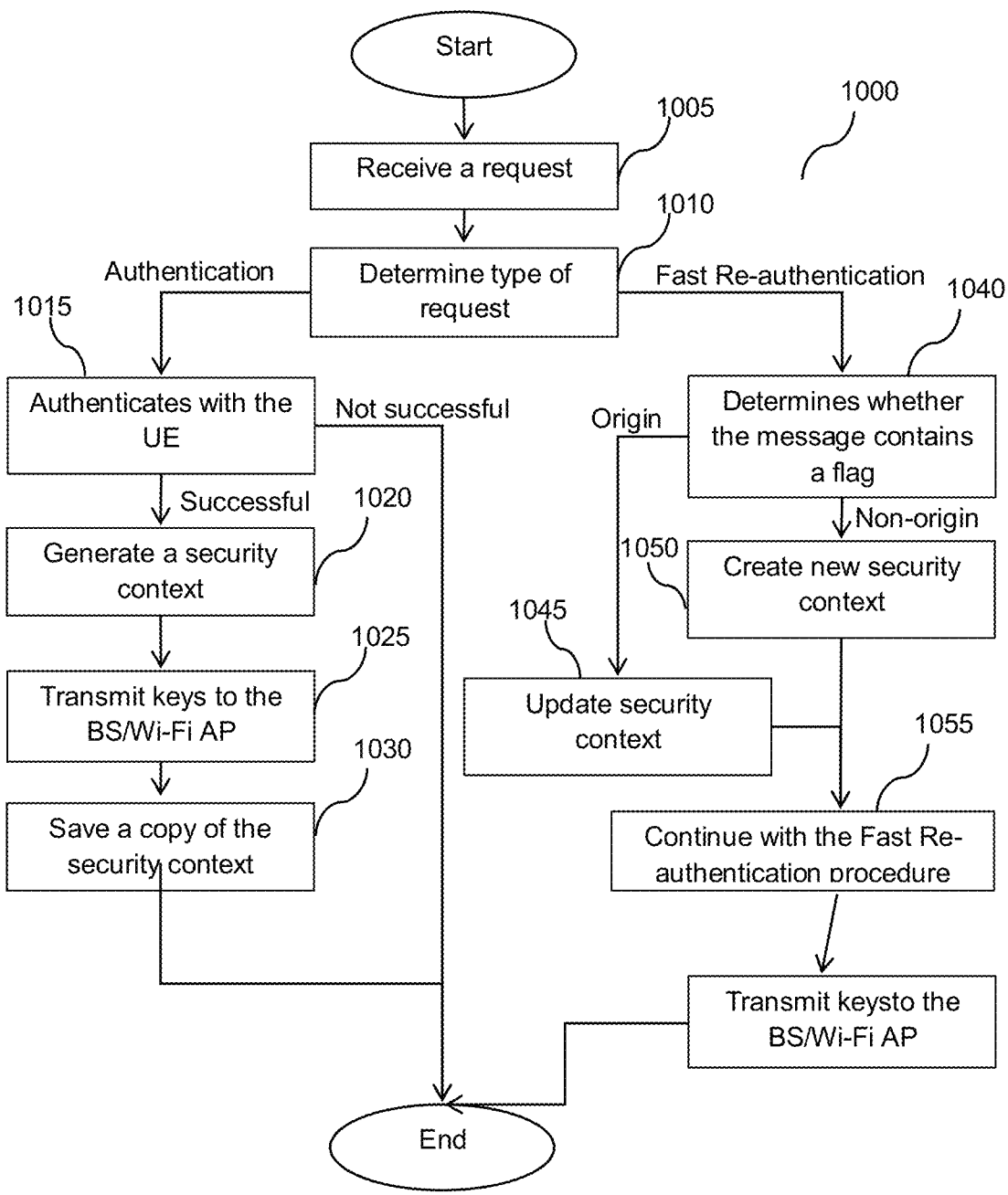
FIG. 10 illustrating a process performed by the network authentication entity in accordance with process 600 and timing diagram 700 in accordance with an embodiment of this disclosure.

FIG. 10 illustrates a process 1000 performed by the network authentication entity in accordance with process 600 and timing diagram 700. Process 1000 begins with step 1005 by receiving a request from the UE. In step 1010, the network authentication entity determines whether the request is for authentication or Fast Re-authentication. If the request is for authentication, process 1000 proceeds to step 1015. If the request is for Fast Re-authentication, process 1000 proceeds to step 1040.

In step 1015, in response to receiving the request for authentication, the network authentication entity authenticates with the UE. If the authentication is successful, process 1000 proceeds to step 1020. Otherwise, process 1000 ends.

In step 1020, the network authentication entity generates a security context. The security context may include Fast Re-authentication ID (FRID), secret key, and a counter. A further secret key is derived from the security context and transmitted to the network entity such as Wi-Fi AP or a base station defined by 3GPP technology, or others in step 1025. A copy of the security context is saved in the database of the network authentication entity in step 1030. The secret key, denoted as k1, transmitted to the base station or Wi-Fi AP is derived from the secret key, denoted as k0, of the security context with a KDF function. Parameters such FRID or counter, or a random number, or a nonce which is transmitted to the UE, may be also taken as an input the KDF function in deriving the k1.

In step 1040, the network authentication entity initiates Fast Re-authentication procedure from a UE by first determining whether the message contains a flag on the origin of the Fast Re-authentication ID. The network authentication entity then determines the origin of the Fast Re-authentication ID.

If the flag indicates that the origin of Fast Re-authentication ID belongs to communication device, then the network authentication entity proceeds to step 1045 to simply update a communication context such as the counter in the security context. If the flag indicates that the origin of the Fast Re-authentication ID does not belong to the communication device, the network authentication entity proceeds to step 1050.

In step 1050, the network authentication entity creates a new security context for the new communication device similar step 1020 and transmits the keys or keys further derived from the security context to the network entities such as Wi-Fi AP or base station defined by 3GPP. Alternatively, the security context may be transmitted at step 1060 together with the Master Session Key to be generated in step 1055.

In step 1055, the network authentication entity continues with the Fast Re-authentication procedure. If authentication is successful, the network authentication entity creates a Master Session Key. The Master Session Key may be included in the security context. Alternatively, the security context may not include the Master Session Key. Instead, the Master Session Key may be generated by the communication device that owns the Fast Re-authentication ID and transmitted to the new communication device. The security context is also saved in the database of the network authentication entity.

In step 1060, the network authentication entity transmits a Fast Re-authentication message to the UE containing the security context. Further details on the procedure for Fast Re-authentication will be described below with reference to FIG. 16. Process 1000 ends after step 1060.

Figure 10A:
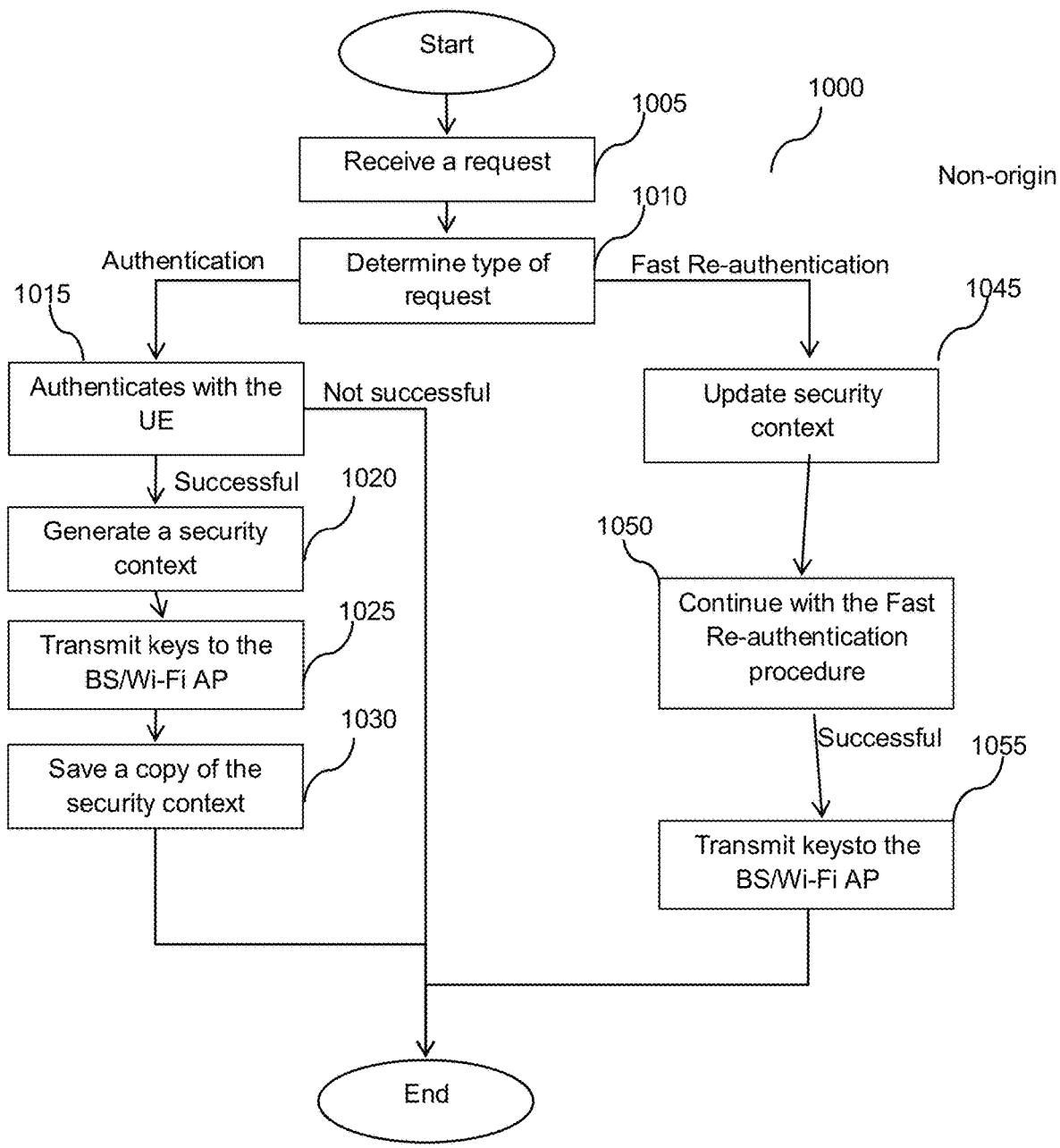
FIG. 10A illustrating an alternative process performed by the network authentication entity in accordance with process 600 and timing diagram 700 in accordance with an embodiment of this disclosure.

FIG. 10A illustrates an alternative process 1000A performed by the network authentication entity in accordance with process 600 and timing diagram 700. Particularly, the Fast Re-authentication procedure does not consider whether the FRID is from the original source and proceeds directly with updating the security context. The authentication process of process 1000A is the same as the authentication process of process 1000.

Process 1000A begins with step 1005A by receiving a request from the UE. In step 1010A, the network authentication entity determines whether the request is for authentication or Fast Re-authentication. If the request is for authentication, process 1000A proceeds to step 1015A. If the request is for Fast Re-authentication, process 1000A proceeds to step 1045A.

In step 1015A, in response to receiving the request for authentication, the network authentication entity authenticates with the UE. If the authentication is successful, process 1000A proceeds to step 1020A. Otherwise, process 1000A ends.

In step 1020A, the network authentication entity generates a security context. The security context may include Fast Re-authentication ID, secret keys, and a counter. A further secret key is derived from the security context and transmitted to the network entity such as Wi-Fi AP or a base station defined by 3GPP technology, or others in step 1025A. A copy of the security context is saved in the database of the network authentication entity in step 1030A. The secret key, denoted as k1, transmitted to the base station or Wi-Fi AP is derived from the secret key, denoted as k0, of the security context with a KDF function. Parameters such FRID or counter, or a random number, or a nonce which is transmitted to the UE may be also take as an input the KDF function in deriving the k1.

In step 1045A, the network authentication entity updates a communication context such as the counter in the security context.

In step 1050A, the network authentication entity continues with the Fast Re-authentication procedure. If authentication is successful, the network authentication entity creates a Master Session Key.

The Master Session Key is then transmitted to the network entities such as Wi-Fi AP or base station defined by 3GPP in step 1055A. Process 1000A ends after step 1055A.

UE with two communication modules and a dedicated authentication management module In the second method of the unified authentication framework, two communication entities/devices within the same UE share authentication information, including fast re-authentication ID and related secret keys, through an authentication management module. Particularly, within a UE, a separate module is provided to manage the authentication information from different communication devices. After receiving the fast re-authentication ID from the network authentication entity, the communication device further passes the Fast Re-authentication ID, secret keys derived (optional), and counter etc., to the authentication management module. The procedure for the two communication entities/devices using shared authentication through an authentication management module will now be described below with reference to FIG. 11.

Figure 11:
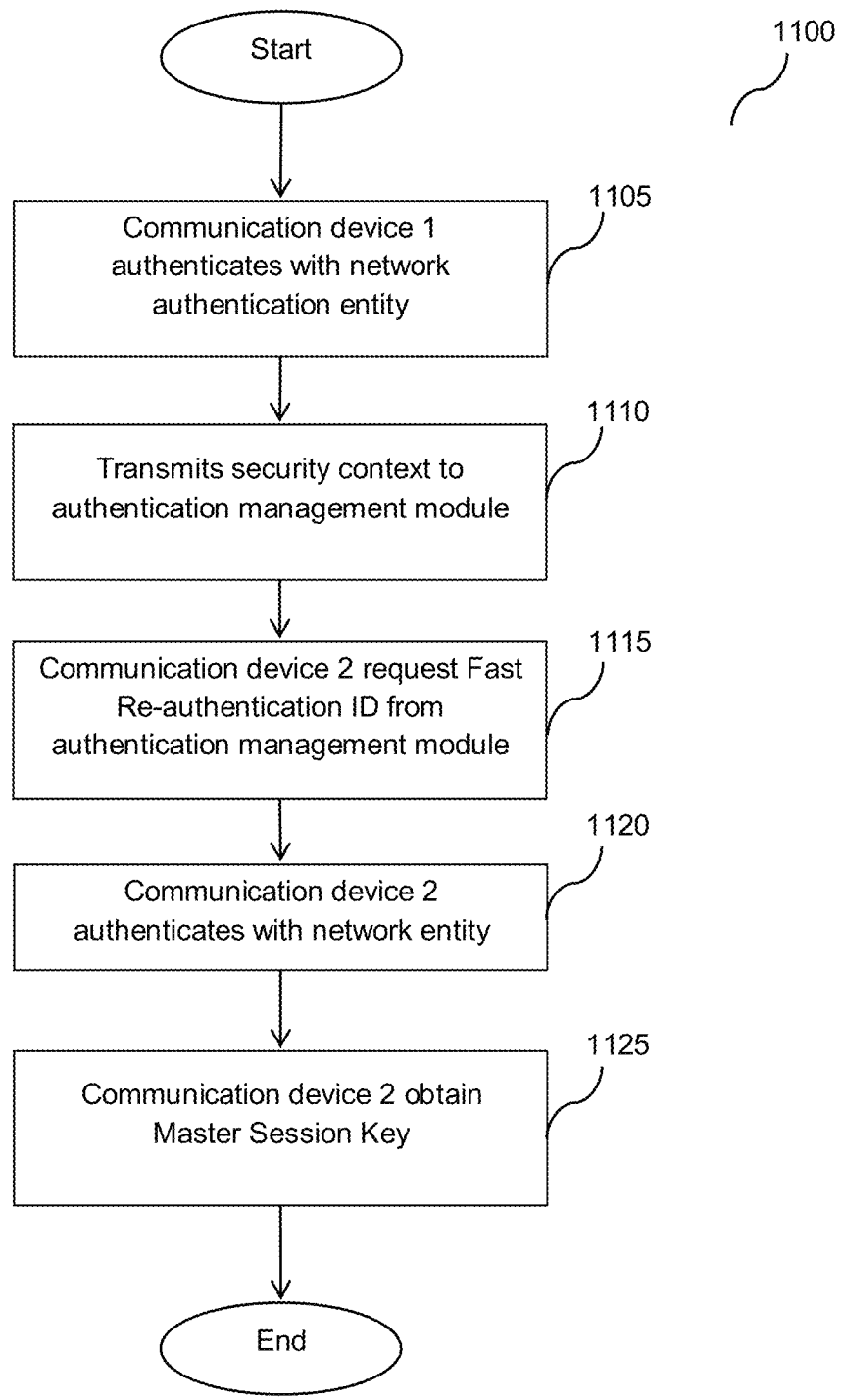
FIG. 11 illustrating a process on a procedure for two communication entities/devices using shared authentication information through an authentication management module to authenticate with a core network in accordance with an embodiment of this disclosure.

FIG. 11 illustrates a process 1100 on a procedure for two communication entities/devices using shared authentication information through an authentication management module to authenticate with a core network. Process 1100 begins with step 1105 where communication device 1 authenticates with the network authentication entity of the core network to obtain a security context. Particularly, the communication device 1 of the UE authenticates with the network authentication entity of the core network and if successful, the network authentication entity generates a security context. In this instance, the network authentication entity may be the AAA server, MME server or a management module that manages AAA and MME servers. The network authentication entity can also be an independent function entity. The security context may include Fast Re-authentication ID, secret keys, and a counter. The security context is then transmitted to the communication device 1. One skilled in the art will recognize that the communication device 1 may generate the security context instead without departing from the disclosure. Step 1105 pertains to the first part of the unified authentication framework. Further details of step 1105 will be described below with reference to FIG. 15.

In step 1110, the communication device 1 transmits the security context to an authentication management module. In another embodiment, the authentication management module may establish security context by itself through the exchanging of authentication message with network authentication entity at the network side. The authentication management module may be an independent module, which can be a hardware or software, and is developed to manage the authentication information from different communication devices within the same UE. Upon receiving the security context from the communication device 1, the authentication management module saves a copy of the security context information.

In step 1115, communication device 2 wishes to authenticate with the core network. However, prior to authenticating with the core network, communication device 2 transmits a request to authentication management module to obtain the Fast Re-authentication ID. Alternatively, the communication device 2 may trigger the authentication management module to start an authentication procedure.

In step 1120, upon receiving the Fast Re-authentication ID from the authentication management module, the communication device 2 uses the Fast Re-authentication ID to authenticate with the core network. Particularly, the communication device 2 starts a Fast Re-authentication procedure with the core network. The Fast Re-authentication procedure begins with the communication device 2 or the authentication management module generating and transmitting a message to the authentication entity. The message includes the Fast Re-authentication ID and a flag to indicate that the Fast Re-authentication ID does not belong to the current communication device and that the current communication device obtains the Fast Re-authentication ID from another device within the same UE. By extracting the flag from the message, the authentication entity at the network side determines an appropriate action in handling the security context. For example, if the flag indicates that the Fast Re-authentication ID belongs to the communication device, then the server may simple update the security context. If the flag indicates that the fast re-authentication ID does not belong to the communication device, the authentication entity may create a new security context.

The network authentication entity may request for further information from the communication device 2 during authentication. Hence, the communication device 2 may request for certain information from the authentication management module. For example, after receiving the Fast Re-authentication message embedded in the EAP-AKA' Request from the network authentication entity, the communication device 2 may send the Fast Re-authentication message to the authentication management module. The authentication management module would then generate a Fast Re-authentication response and transmit the Fast Re-authentication response to the communication device 2. The communication device 2 then transmits the Fast Re-authentication response message to the network authentication entity at the network side. The network authentication entity authenticates the communication device 2 with the Fast Re-authentication response message. Further, other messages such notification and success message may be exchanged between the communication devices or the authentication management module and the authentication entities at the network side. Further details of step 1120 will be described below with reference to FIG. 16.

In step 1125, if the network authentication entity determines that the Fast Re-authentication ID does not belongs to communication device 2 and authentication with communication device 2 is successful, the network authentication entity generates a security context for communication device 2. The security context includes at least a master session key. The Master Session Key may be generated by the authentication management module and transmitted to communication device 2. Steps 1115, 1120 and 1125 pertain to the second part of the unified authentication framework. Process 1100 ends after 1125.

Figure 12:
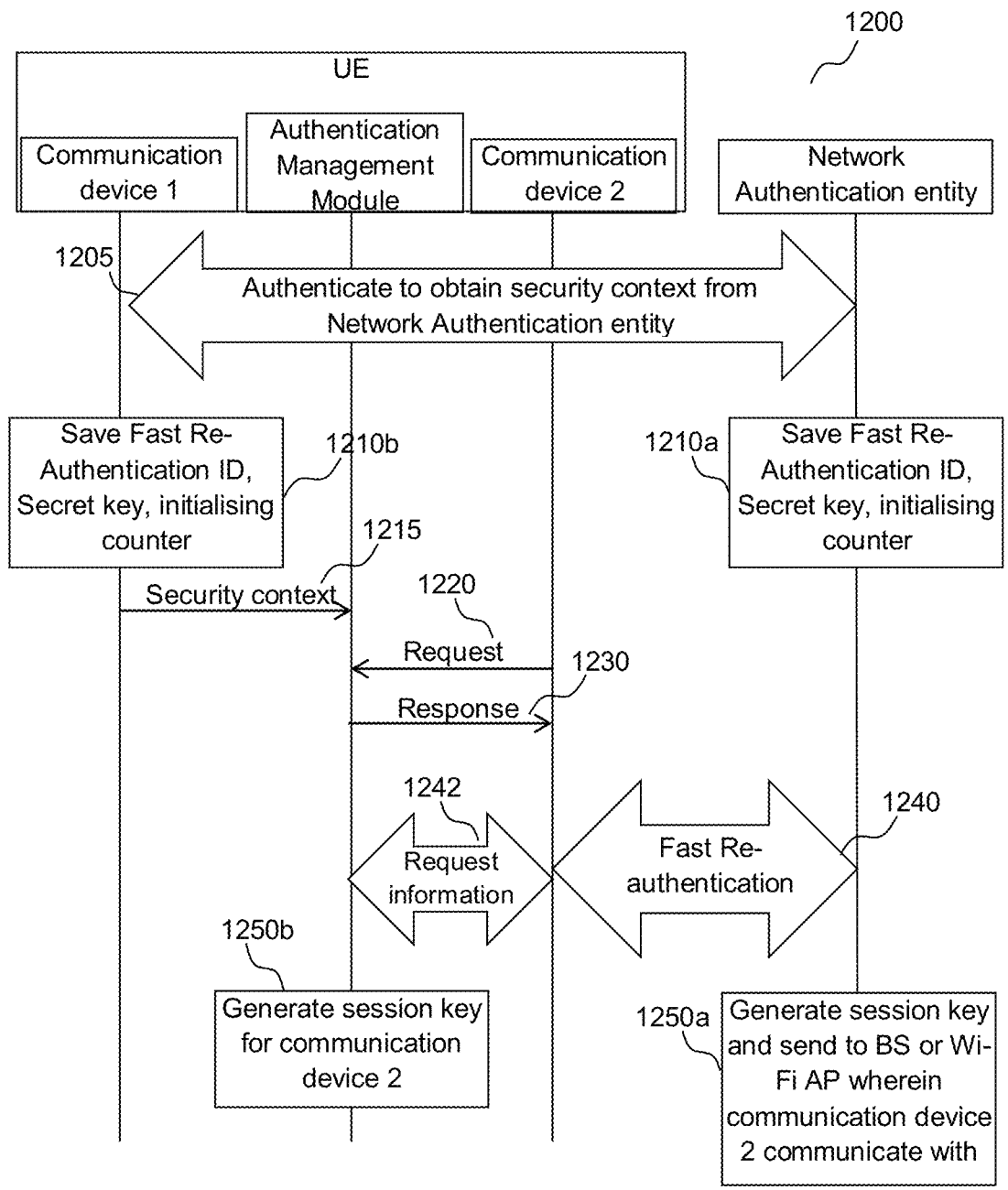
FIG. 12 illustrating a timing diagram on the procedure for two communication entities/devices using shared authentication information through an authentication management module to authenticate with the core network as shown in FIG. 11 in accordance with an embodiment of this disclosure.

FIG. 12 illustrates a timing diagram 1200 on the procedure for two communication entities/devices using shared authentication information through an authentication management module to authenticate with the core network as shown in FIG. 11. Timing diagram 1200 begins with step 1205 where communication device 1 authenticates with the network authentication entity of the core network to establish a security context. Similar to step 1105 in process 1100, the communication device 1 of the UE authenticates with the network authentication entity of the core network and if successful, the network authentication entity generates a security context. In this instance, the network authentication entity may be the AAA server, MME server or a management module that manages AAA and MME servers. The security context may include Fast Re-authentication ID, secret keys, and a counter. One skilled in the art will recognize that the communication device 1 may generate the security context instead without departing from the disclosure. Further details of step 1205 will be described below with reference to FIG. 15.

After authentication is successful in step 1205, the network authentication entity saves the Fast Re-authentication ID, secret keys, and initializes a counter in step 1210*a*. Similarly, at the UE end, the communication device 1 also saves the Fast Re-authentication ID, secret keys, and initializes a counter in step 1210*b*. Steps 1205, 1210*a* and 1210*b* pertain to the first part of the unified authentication framework.

In step 1215, the communication device 1 transmits the security context to an authentication management module. The authentication management module may be an independent module, which can be a hardware or software, and is developed to manage the authentication information from different communication devices within the same UE. Upon receiving the security context from the communication device 1, the authentication management module saves a copy of the security context information.

In step 1220, communication device 2 wishes to authenticate with the core network. To do so, communication device 2 transmits a request to authentication management module to obtain the Fast Re-authentication ID. In response to the request from communication device 2, authentication management module transmits a response containing the Fast Re-authentication ID to the communication device 1 in step 1230.

In step 1240, upon receiving the Fast Re-authentication ID from the authentication management module, the communication device 2 uses the Fast Re-authentication ID to authenticate with the core network. Particularly, the communication device 2 starts a Fast Re-authentication procedure with the network authentication entity of the core network. The Fast Re-authentication procedure begins with the communication device 2 generating and transmitting a message to the authentication entity. The message includes the Fast Re-authentication ID and a flag to indicate that the Fast Re-authentication ID does not belong to the current communication device and that the current communication device obtains the Fast Re-authentication ID from another device within the same UE. By extracting the flag from the message, the authentication entity at the network side determines an appropriate action in handling the security context. For example, if the flag indicates that the Fast Re-authentication ID belongs to the communication device, then the server may simple update the security context. If the flag indicates that the fast re-authentication ID does not belong to the communication device, the authentication entity may create a new security context.

During step 1240, the network authentication entity may request for further information from the communication device 2. Hence, the communication device 2 may request for certain information from the authentication management module in step 1442. For example, after receiving the Fast Re-authentication message embedded in the EAP-AKA' Request from the network authentication entity, the communication device 2 may send the Fast Re-authentication message to the authentication management module. The authentication management module would then generate a Fast Re-authentication response and transmit the Fast Re-authentication response to the communication device 2. The communication device 2 then transmits the Fast Re-authentication response message to the network authentication entity at the network side. The network authentication entity authenticates the communication device 2 with the Fast Re-authentication response message. Further, other messages such notification and success message may be exchanged between the communication device 2 and the authentication entity at the network side. Further details of steps 1240 and 1242 will be described below with reference to FIG. 16.

In step 1250*a*, if the network authentication entity determines that the Fast Re-authentication ID does not belongs to communication device 2 and authentication with communication device 2 is successful, the network authentication entity generates a security context for communication device 2. A Master Session Key is also generated and included in the security context. The security context is transmitted to the network entity such as Wi-Fi AP or a base station defined by 3GPP technology, or others. The network entity would further transmit the security context without the Master Session Key to the authentication management module. Alternatively, the Master Session Key may be generated by the authentication management module and transmitted to communication device 2 in step 1250*b*. Steps 1240, 1242, 1250*a* and 1250*b* pertain to the second part of the unified authentication framework. In the alternative process where the security context is shared by the communication devices, a new security context would not be generated. Instead, only a Master Session Key is generated and transmitted to the network entity.

Timing diagram 1200 ends after step 1250*a* or 1250*b*.

Figure 12A:
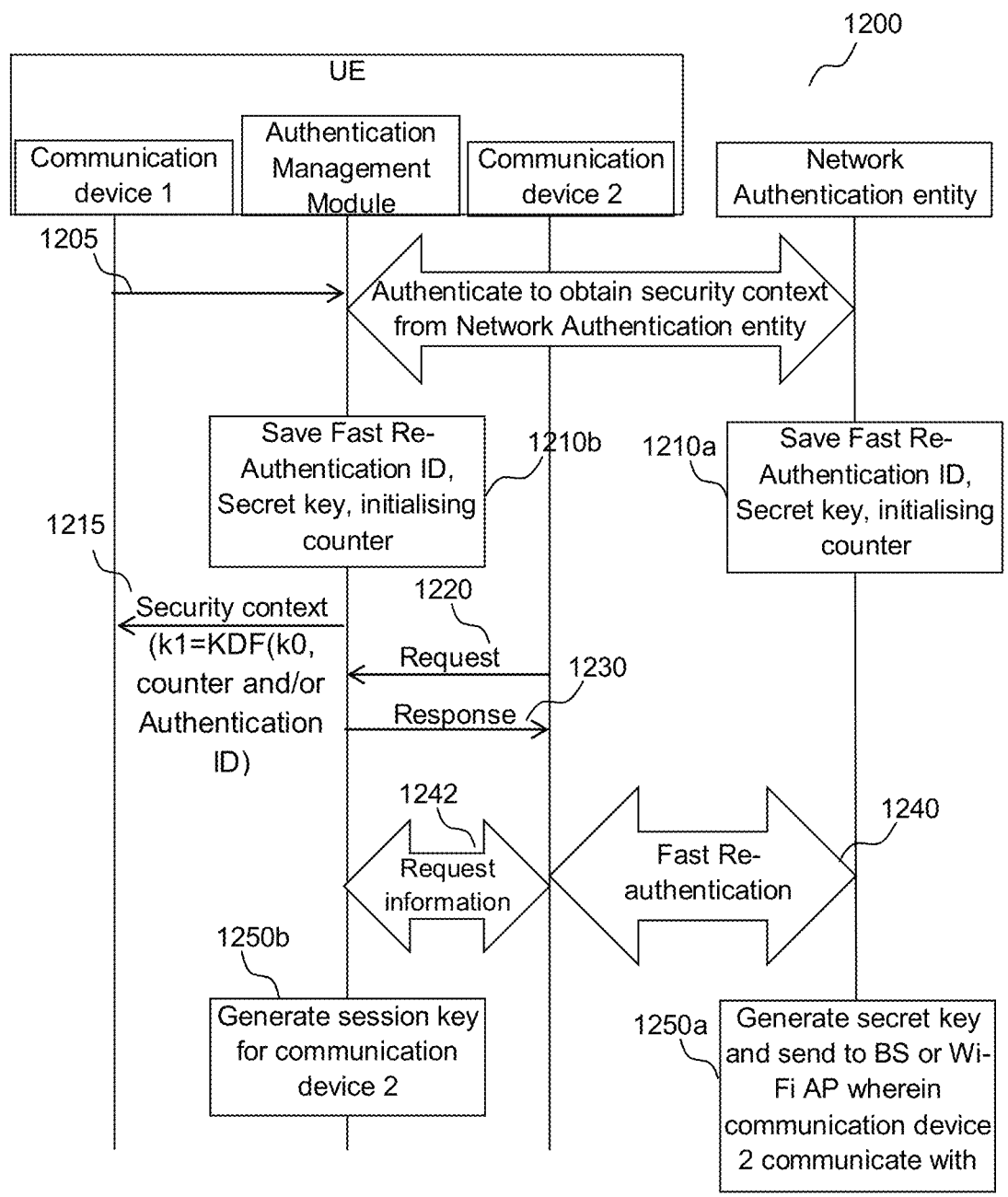
FIG. 12A illustrating a modified timing diagram on the procedure for two communication entities/devices using shared authentication information through an authentication management module to authenticate with the core network as shown in FIG. 11 in accordance with an embodiment of this disclosure.

FIG. 12A illustrates a modification to timing diagram 1200. Specifically, the steps 1205-1215 in timing diagram 1200 are being modified in the following manner. In step 1205, instead of the communication device 1 authenticating with the network authentication entity of the core network to establish a security context, the communication device 1 trigger the authentication management module to authenticate with the network authentication entity of the core network to establish a security context. Particularly, the communication device 1 transmits an authentication request to the authentication management module to authenticate with the network authentication entity of the core network to establish a security context. In response to receiving the trigger from the communication device 1, the authentication management module of the UE authenticates with the network authentication entity of the core network and if successful, the network authentication entity generates a security context. The security context may include Fast Re-authentication ID, secret keys, and a counter. One skilled in the art will recognize that the authentication management module may generate the security context instead without departing from the disclosure.

After authentication is successful in step 1205, the network authentication entity saves the Fast Re-authentication ID, secret keys, and initializes a counter in step 1210*a*. Similarly, at the UE end, the authentication management module also saves the Fast Re-authentication ID, secret keys, and initializes a counter in step 1210*b*. The network authentication entity and the authentication management module derive new keys based on the secret keys established after the authentication procedure. In one embodiment, if the secret keys established after authentication is k0, then the authentication module and network authentication entity further derives a new key, k1, using key derivation function (KDF). Particularly k1 may be derived by using the secret key and the counter and expressed in the following manner, k1=KDF(k0, counter). In another embodiment, the authentication management module and network authentication entity may derive k1 by using the secret keys and Fast Re-authentication ID and expressed in the following manner, k1=KDF(k0, Fast Re-authentication ID). The secret key, k0, is kept in the authentication management module and network authentication entity while k1 is included in the security context and transmitted to communication devices by the authentication management module. k1 is also included in the security context transmitted to base station or Wi-Fi AP by the network authentication entity. The authentication management module can be the supplicant as defined in the EAP framework and the network authentication entity can be the authentication server in the EAP framework or the authentication unit named as CP-AU in 3GPP specifications such as in TR 23.799. For the avoidance of doubt, the secret keys are generated by the network authentication entity and authentication management module separately.

In step 1215, the authentication management module transmits the security context to communication device 1. Upon receiving the security context from the authentication management module, the communication device 1 saves a copy of the security context information. The rest of the steps 1220-1250 remain unchanged.

Figure 13:
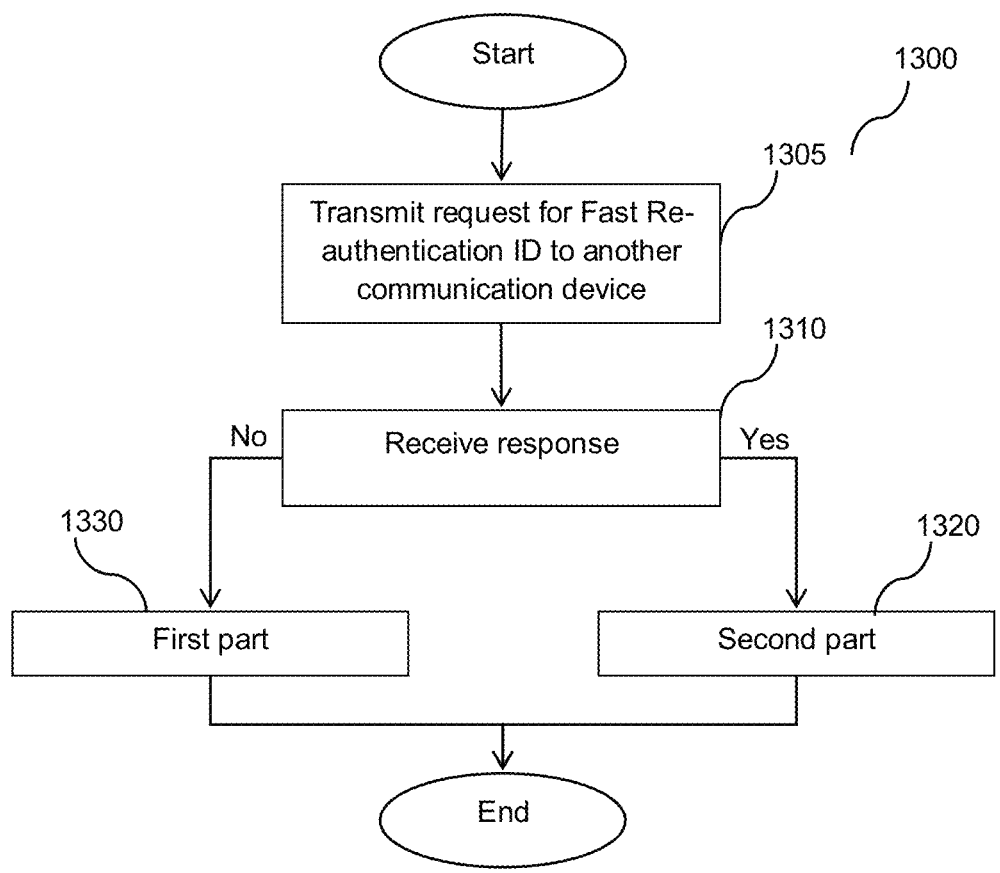
FIG. 13 illustrating a process performed by either one of communication devices 1 and 2 in accordance with process 1100 and timing diagram 1200 in accordance with an embodiment of this disclosure.

FIG. 13 illustrates a process 1300 performed by either one of communication devices 1 and 2 in accordance with process 1100 and timing diagram 1200 of FIG. 12 or 12A. Process 1300 begins with step 1305 by transmitting a request for Fast Re-authentication ID to the authentication management module of the UE. In step 1310, the communication device receives a response from the authentication management module. If the response contains a Fast Re-authentication ID, the communication device proceeds to step 1320. If the response does not contain a Fast Re-authentication ID, the communication device proceeds to step 1330.

In step 1320, the communication device proceeds with second part of the unified authentication framework. In step 1330, the communication device proceeds with first part of the unified authentication framework. Particularly, the communication device authenticates with the network authentication entity to obtain security context directly as illustrated in FIG. 12 or indirectly via the authentication management module as illustrated in FIG. 12A. Process 1300 ends after step 1320 or 1330.

Figure 14:
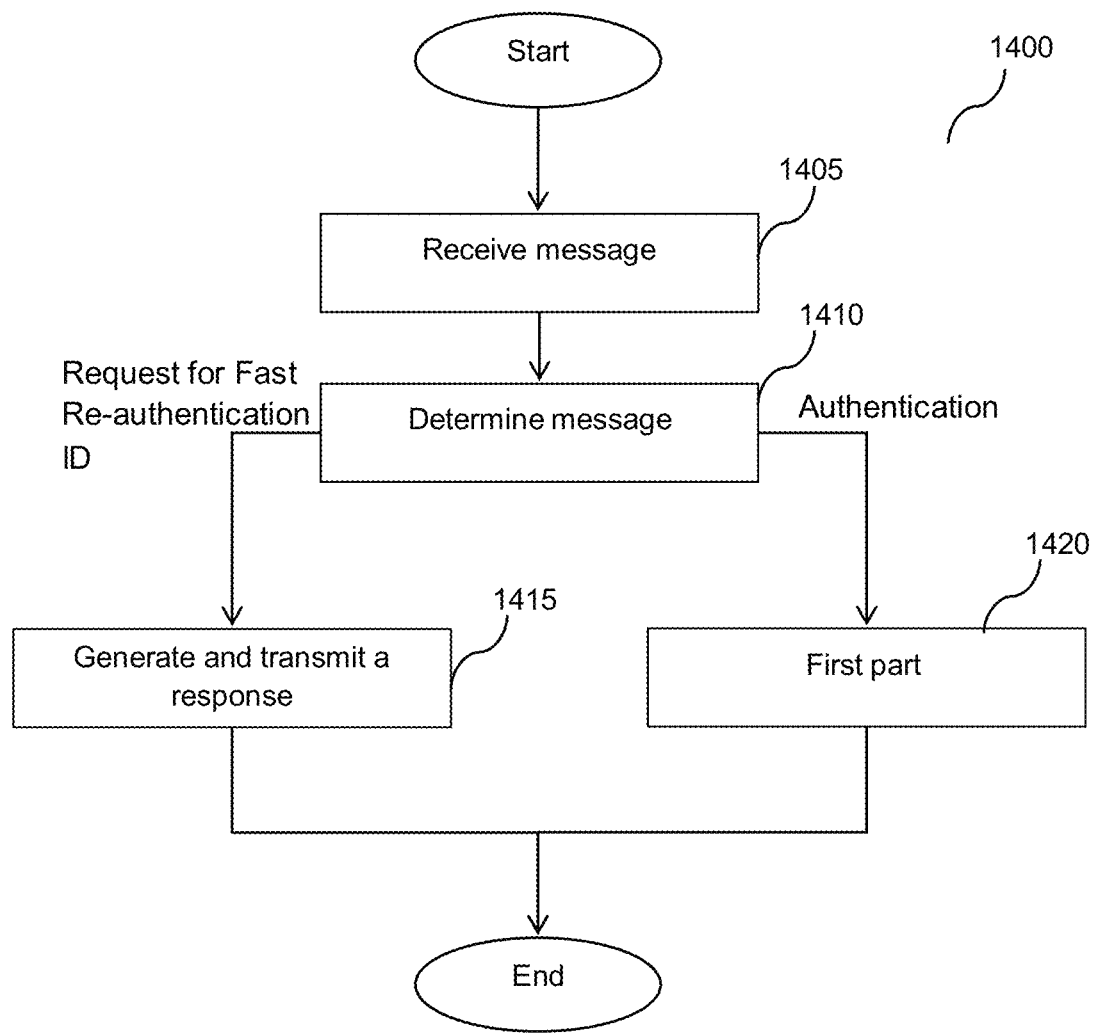
FIG. 14 illustrating a process performed by the authentication management module in accordance with process 1100 and timing diagram 1200 in accordance with an embodiment of this disclosure.

FIG. 14 illustrates a process 1400 performed by the authentication management module in accordance with process 1100 and timing diagram 1200 of FIG. 12 or 12A. Process 1400 begins with step 1405 by receiving a message from the communication device of the UE. Process 1400 then determines whether the message is a request for Fast Re-authentication ID or a request to trigger the authentication management module to authenticate with the network authentication entity of the core network to establish a security context in step 1410. If the message is a request for Fast Re-authentication ID from the communication device of the UE, process 1400 proceeds to step 1415. If the message is a request to trigger the authentication management module to authenticate with the network authentication entity of the core network to establish a security context, process 1400 proceeds to step 1420.

In step 1415, the authentication management module generates and transmits a response containing the Fast Re-authentication ID, secret key and counter. If authentication management module does not have the Fast Re-authentication ID, authentication management module generates and transmits a response indicating that it does not have a Fast Re-authentication ID.

In step 1420, process 1400 proceeds with first part of the unified authentication framework. Further details on the first part of the unified authentication framework will be described below.

Process 1400 ends after step 1420.

The process performed by the network authentication entity in accordance with process 1100 and timing diagram 1200 is similar to process 1000.

We shall now turn our attention to the authentication and Fast Re-authentication procedures.

Collaborative Authentication

Figure 15:
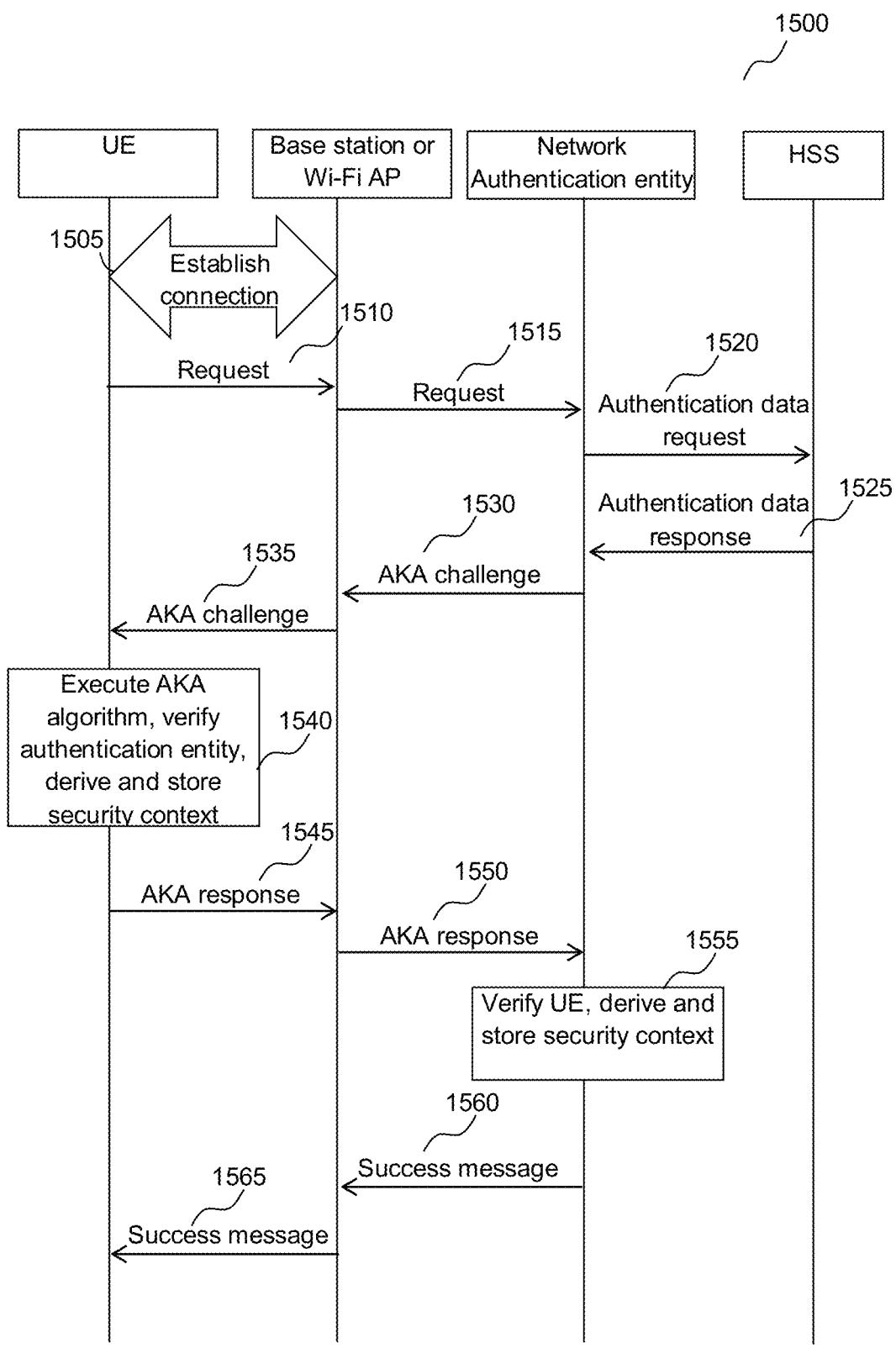
FIG. 15 illustrating a timing diagram of an authentication procedure in accordance with the first part of the unified authentication framework in accordance with an embodiment of this disclosure.

FIG. 15 illustrates a timing diagram 1500 of an authentication procedure in accordance with the first part of the unified authentication framework. The authentication is based on AKA Fast Re-authentication procedure. It is important to note that there may be slight differences in the authentication procedure and this is dependent on the communication devices in the UE. The main differences would be highlighted in the description below with reference to timing diagram 1500.

Timing diagram 1500 begins with 1505 where the UE establishes a connection with a base station of a cellular access network (if the communication device is a cellular technology) such as a 3GPP access network or a Wi-Fi AP (if the communication device is a Wi-Fi entity). Alternatively, the Wi-Fi AP may be an Evolved Packet Data Gateway (ePDG) or a Trusted WLAN Access Gateway/Proxy (TWAG/TWAP).

In step 1510, in response to establishing the connection, the UE requests access to 3GPP access network by sending a Request containing the UE's ID to the base station (if the communication device is a cellular technology entity). In the case where communication device of the UE is a Wi-Fi entity, the Wi-Fi AP initiates an AKA authentication process by sending the UE a request message. In response, the Wi-Fi entity of the UE responds to the Wi-Fi AP a response message with the UE's ID in the message.

In step 1515, the base station forwards the Request message to the network authentication entity. Similarly, the Wi-Fi AP forwards the response message in the form of a Request message to the network authentication entity.

In step 1520, the network authentication entity transmits an authentication data requests message to the HSS (Home Subscriber Server) to obtain the UE's authentication data. The authentication data request message contains the UE's ID.

Upon receiving the authentication data request message from the network authentication entity, the HSS locates a key, K, according to the UE's ID, and computes the authentication vector using AKA algorithm. The HSS then sends an Authentication Data Response with the authentication vectors to the network authentication entity in step 1525. The authentication data response contains the authentication vector. The authentication vector contains a random number (RAND), a network authentication token (AUTN) that is used for authenticating the network to the identity module, an expected result part (XRES), a 128-bit session key for integrity check (IK), and a 128-bit session key for encryption (CK). The process of generating the authentication vector is well known and will be omitted for brevity.

In step 1530, the network authentication entity transmits an AKA-Challenge message containing a Fast Re-authentication ID, RAND, AUTH, the Serving Network Identity (SN ID), and the Network Type and a message authentication code (MAC) to the base station or the Wi-Fi AP depending on which of the communication device initiate the authentication process. The fast re-authentication ID may be generated by the network authentication entity by combining the UE's ID with a random number. Alternatively, the fast re-authentication ID may be generated by combining the UE's ID with a pre-determined number based on the type of the communication device making the request. For example, if the communication device is a Wi-Fi entity, the predetermined number is 01 and if the communication device is a cellular entity, the predetermined number is 02. One skilled in the art will recognize that other methods of generating a fast re-authentication ID may be implemented without departing from the disclosure. The MAC is generated using the IK with input being RAND, AUTH and fast re-authentication ID. The exact process of generating the MAC is known and will be omitted for brevity.

In step 1535, the base station forwards the AKA-Challenge message to the UE while the Wi-Fi AP forwards the AKA-Challenge message to the UE.

In step 1540, the UE authenticates the network authentication entity by first verifying the AKA-Challenge message based on the MAC and subsequently, after successfully verifying the veracity of the AKA-Challenge message, running an AKA algorithm using RAND and AUTH. The UE further derives keys for cellular access or non-cellular access. The UE stores the Fast Re-authentication ID, derives keys for fast re-authentication, and initiates a counter for fast re-authentication. Further details on the UE generating the key for fast re-authentication will be described below with reference to FIG. 16.

It is noted that the keys for cellular access include the key for encrypting the traffic between the UE and the base station and the key for integrity protection of such traffic. Further, the keys for fast re-authentication include an encryption key for encrypting some data during re-authentication, and an authentication key for generating MAC (message authentication code).

It is noted that the keys for non-cellular access include the key for encrypting the traffic between the UE and the gateway and the key for integrity protection of such traffic. Further, keys for fast re-authentication include an encryption key for encrypting some data during re-authentication, and an authentication key for generating MAC (message authentication code).

In step 1545, the UE sends an AKA Challenge response message to the base station. In the case involving the Wi-Fi entity, the UE transmits an AKA-Challenge response message to the gateway. The AKA Challenge response message contains RES and MAC generated by the UE.

In step 1550, the base station or the Wi-Fi AP forwards the AKA-Challenge response message to the network authentication entity.

In step 1555, the network authentication entity authenticates the UE by verifying the received AKA-Challenge message. Particularly, the network authentication entity verifies the message by checking whether the RES and MAC in the received message are correct. The network authentication entity then derives keys for cellular access or non-cellular access, and stores the Fast Re-authentication ID. The Keys are derived using key derivation functions (KDF), which are pseudo-random functions. The inputs of KDFs include UE's ID and RAND. Subsequently, the network authentication entity initiates a counter for Fast Re-authentication.

In step 1560, the network authentication entity transmits a success message to the base station or Wi-Fi AP that the authentication is successful and the keys for the UE's cellular or non-cellular access. Upon receiving the success message and keys, the base station or Wi-Fi AP transmits the success message and keys to the UE in step 1565. Timing diagram 1500 ends after step 1565. In the case where the authentication is requested by the authentication management module on behalf of any one of the communication device, the network authentication entity and the authentication management module further derive new keys based on the secret keys established after the authentication procedure. In one embodiment, if the secret keys established after authentication is k0, then the authentication module and network authentication entity further derives a new key, k1, using key derivation function (KDF). Particularly k1 may be derived by using the secret key and the counter and expressed in the following manner, k1=KDF(k0, counter). In another embodiment, the authentication management module and network authentication entity may derive k1 by using the secret keys and Fast Re-authentication ID and expressed in the following manner, k1=KDF(k0, Fast Re-authentication ID). The secret key, k0, is kept in the authentication management module and network authentication entity while k1 is included in the security context and transmitted to communication devices by the authentication management module. k1 is also included in the security context transmitted to base station or Wi-Fi AP by the network authentication entity. The authentication management module can be the supplicant as defined in the EAP framework and the network authentication entity can be the authentication server in the EAP framework or the authentication unit named as CP-AU in 3GPP specifications such as in TR 23.799.

Figure 16:
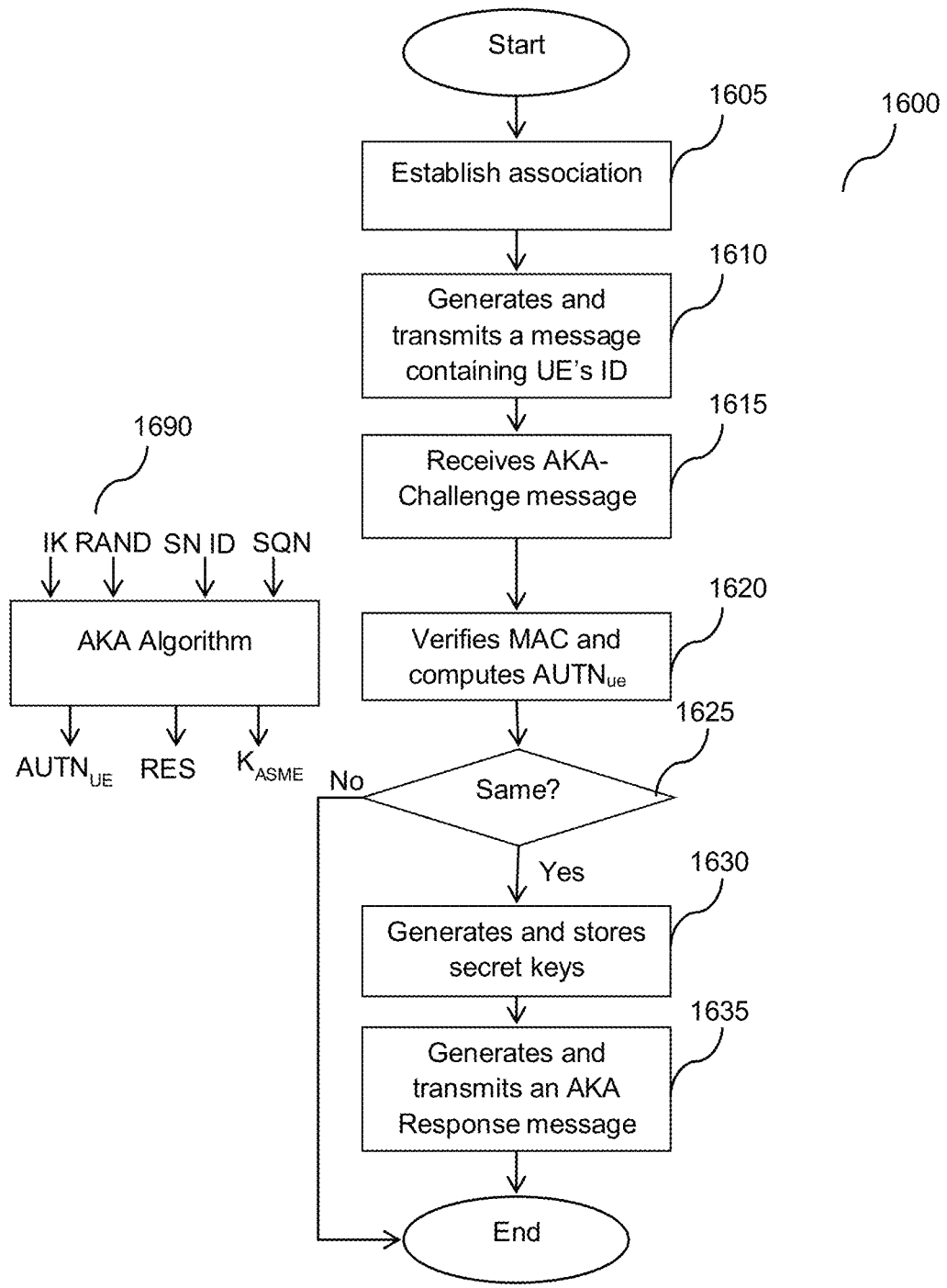
FIG. 16 illustrating a process performed by either one of communication devices 1 and 2 in accordance with timing diagram 1500 in accordance with an embodiment of this disclosure.

FIG. 16 illustrates a process flow 1600 performed by the UE in accordance with the first part of the unified authentication framework as described with reference to timing diagram 1500. Process 1600 begins with step 1605 by establishing an association with the base station of a cellular access network (if the communication device is a cellular entity) such as a 3GPP access network or a Wi-Fi AP (if the communication device is a Wi-Fi entity). Alternatively, the Wi-Fi AP may be an Evolved Packet Data Gateway (ePDG) or a Trusted WLAN Access Gateway/Proxy (TWAG/TWAP).

In step 1610, the UE retrieves its identity (UE's ID) and subsequently generates and transmits a Request comprising the UE's ID. The Request is transmitted to the base station (if the communication device is a cellular technology entity). In turn, the base station forwards the Request message to the network authentication entity. In the case where communication device of the UE is a Wi-Fi entity, the Wi-Fi AP initiates an AKA authentication process by sending the UE a request message. In response, the Wi-Fi entity of the UE responds to the Wi-Fi AP with a response message with the UE's ID in the message. The Wi-Fi AP then forwards the response message as a Request message to the network authentication entity.

In step 1615, the UE receives an AKA-Challenge message. The AKA-Challenge message includes the RAND and AUTN generated by the HSS. The AKA-Challenge message also contains a FRID and MAC generated by the network authentication entity.

In step 1620, the UE verifies MAC using its key (IK). It is noted that the UE has been registered with the HSS and both UE and HSS has the same key. In order to verify the MAC, the UE generates a MAC with FRID, RAND and AUTN using the same MAC generation function used by the network authentication entity with IK. One example of the MAC generation function is keyed Hash Message Authentication Code (HMAC). If the MAC is valid, step 1620 continues to compute an authentication vector using the AKA algorithm 1690. The input parameters for the AKA algorithm include IK, RAND, SN ID, and SQN. The output parameters from the AKA key derivation function algorithm include AUTNUE, RES, and KASME.

In step 1625, the UE authenticates with the network authentication entity by verifying whether AUTNUE is equal to AUTN. If the AUTNUE is not equal to AUTN, process 1700 ends. If AUTNUE is equal to AUTN, process 1600 proceeds to step 1630.

In step 1630, the UE derives secret keys for cellular access or non-cellular access. The keys are derived using key derivation functions (KDF), which are pseudo-random functions. The inputs of KDFs include UE's ID and RAND. One skilled in the art will recognize that other input such as UE's root key may be included as an input of the KDF to generate the secret key without departing from the disclosure. The UE stores the security context comprising the FRID, secret keys for fast re-authentication, and initiates a counter for fast re-authentication. In the case where an authentication management module is available, the security context is store on the authentication management module. If an authentication management module is not available, the security context is stored on either the first or second communication device. In the case where the authentication is requested by the authentication management module on behalf of any one of the communication device, step 1630 is modified such that the authentication management module further derives new keys based on the secret keys established. In one embodiment, if the secret keys established after authentication is k0, then the authentication management module further derives a new key, k1, using key derivation function (KDF) for the communication device. Particularly k1 may be derived by using the secret key and the counter and expressed in the following manner, k1=KDF (k0, counter). In another embodiment, the authentication management module may derive k1 by using the secret keys and Fast Re-authentication ID and expressed in the following manner, k1=KDF(k0, Fast Re-authentication ID). The secret key, k0, is kept in the authentication management module while k1 is included in the security context and transmitted to communication devices by the authentication management module. The authentication management module can be the supplicant as defined in the EAP framework.

In step 1635, the UE generates and transmits an AKA Response message to the network authentication entity. The AKA Response message includes RES determined in step 1620. Process 1600 ends after step 1635.

Figure 17:
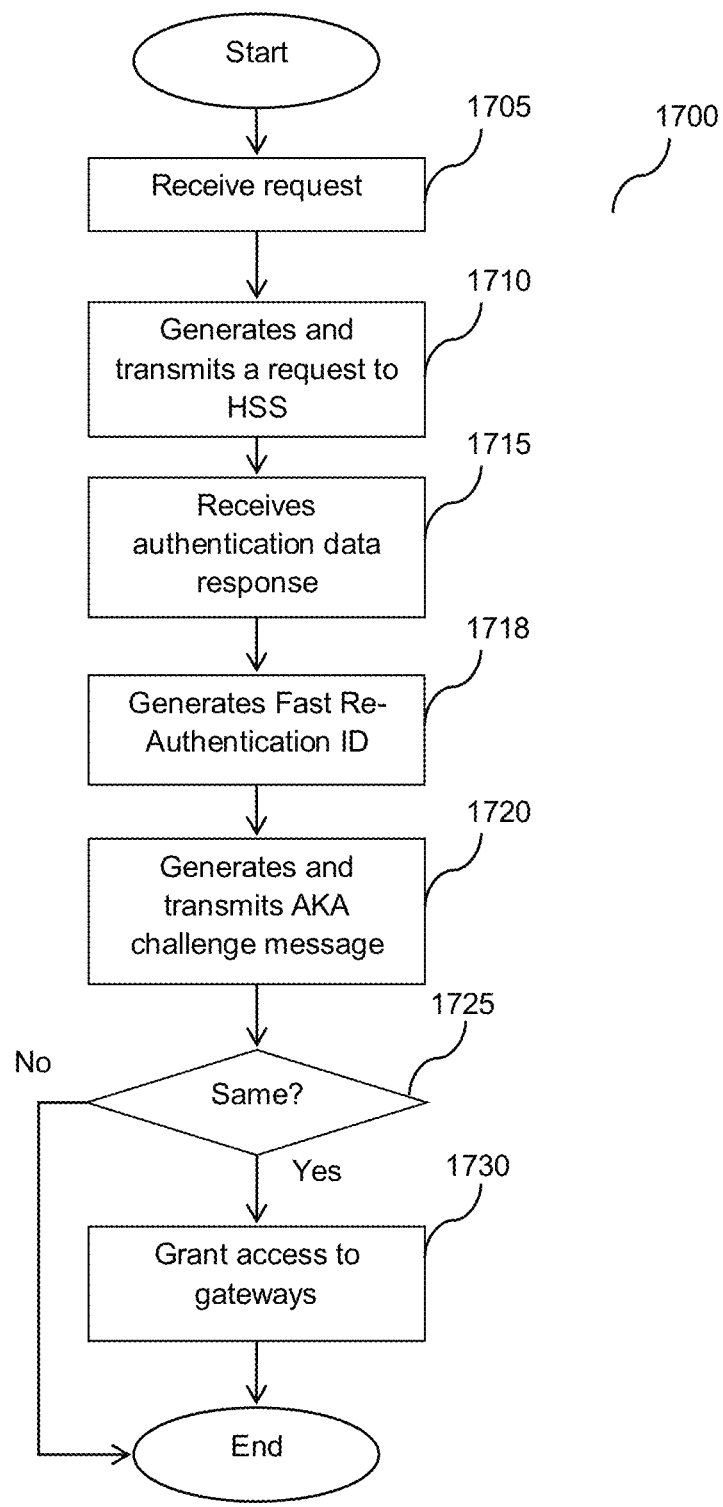
FIG. 17 illustrating a process performed by the network authentication entity in accordance with timing diagram 1500 in accordance with an embodiment of this disclosure.

FIG. 17 illustrates a process flow 1700 performed by the network authentication entity in the core network in accordance with the first part of the unified authentication framework as described with reference to timing diagram 1500. Process 1700 begins with step 1705 by receiving the Request message from the UE via either the base station or Wi-Fi AP.

In step 1710, the network authentication entity generates and transmits an Authentication Data Request to the HSS based on the information received from the UE. Other information such as the SN ID and network type can be retrieved by the MME based on the request received from the UE. The Authentication Data Request includes UE's ID, SN ID, and the network type.

In step 1715, the network authentication entity receives the Authentication Data Response from the HSS. The Authentication Data Response contains RAND, AUTN, XRES, IK, and CK (may also be known as KASME).

In step 1718, the network authentication entity generates a Fast Re-authentication ID (FRID) by combining the UE's ID with a random number. Alternatively, the FRID may be generated by combining the UE's ID with a pre-determined number based on the type of the communication device making the request. For example, if the communication device is a Wi-Fi entity, the predetermined number is 01, if the communication device is a cellular entity, the predetermined number is 02, and if the request is from the authentication management module, the predetermined number is 03. One skilled in the art will recognize that other methods of generating a fast re-authentication ID may be implemented without departing from the disclosure.

In step 1720, the network authentication entity generates and transmits AKA-Challenge message containing the FRID, RAND, AUTH, and a message authentication code (MAC) to the base station or the Wi-Fi AP depending on which of the communication device initiate the authentication process. The MAC is generated using IK. The input parameters of MAC include FRID, RAND, AUTH, and can be expressed in the following manner, $$MAC=MAC_{IK}(FRID\|RAND\|AUTH)$$

In step 1725, the network authentication entity receives the AKA response from the UE. In response, the network authentication entity determines whether RES (from the AKA response) is equal to XRES (from the Authentication Data Response). If RES is not equal to XRES, process 1700 ends. If RES is equal to XRES, process 1700 proceeds to step 1730.

In step 1730, the network authentication entity grants the UE access to its gateways in step 1730. Particularly, the network authentication entity sends a message to the gateways to grant access to the UE. Further, the network authentication entity derives secret keys for cellular access or non-cellular access. The keys are derived using key derivation functions (KDF), which are pseudo-random functions. The inputs of KDFs include UE's ID and RAND. One skilled in the art will recognize that other input such as UE's root key may be included as an input of the KDF to generate the secret key without departing from the disclosure. The network authentication entity stores the security context comprising the FRID, secret keys for fast re-authentication, and initiates a counter for fast re-authentication. The network authentication entity also generates and transmits a success message to the UE via the base station or Wi-Fi AP indicating that the authentication is successful. Process 1700 ends after step 1730.

In the case where the authentication is requested by the authentication management module on behalf of any one of the communication device, step 1730 may be modified such that the network authentication entity further derive new keys based on the secret keys established for the communication device. In one embodiment, if the secret keys established after authentication is k0, then the network authentication entity further derives a new key, k1, using key derivation function (KDF). Particularly k1 may be derived by using the secret key and the counter and expressed in the following manner, k1=KDF(k0, counter). In another embodiment, the network authentication entity may derive k1 by using the secret keys and Fast Re-authentication ID and expressed in the following manner, k1=KDF(k0, Fast Re-authentication ID). The secret keys, k0 and k1, are kept in the network authentication entity and included in the security context transmitted to base station or Wi-Fi AP by the network authentication entity. The network authentication entity can be the authentication server in the EAP framework or the authentication unit named as CP-AU in 3GPP specifications such as in TR 23.799.

Figure 18:
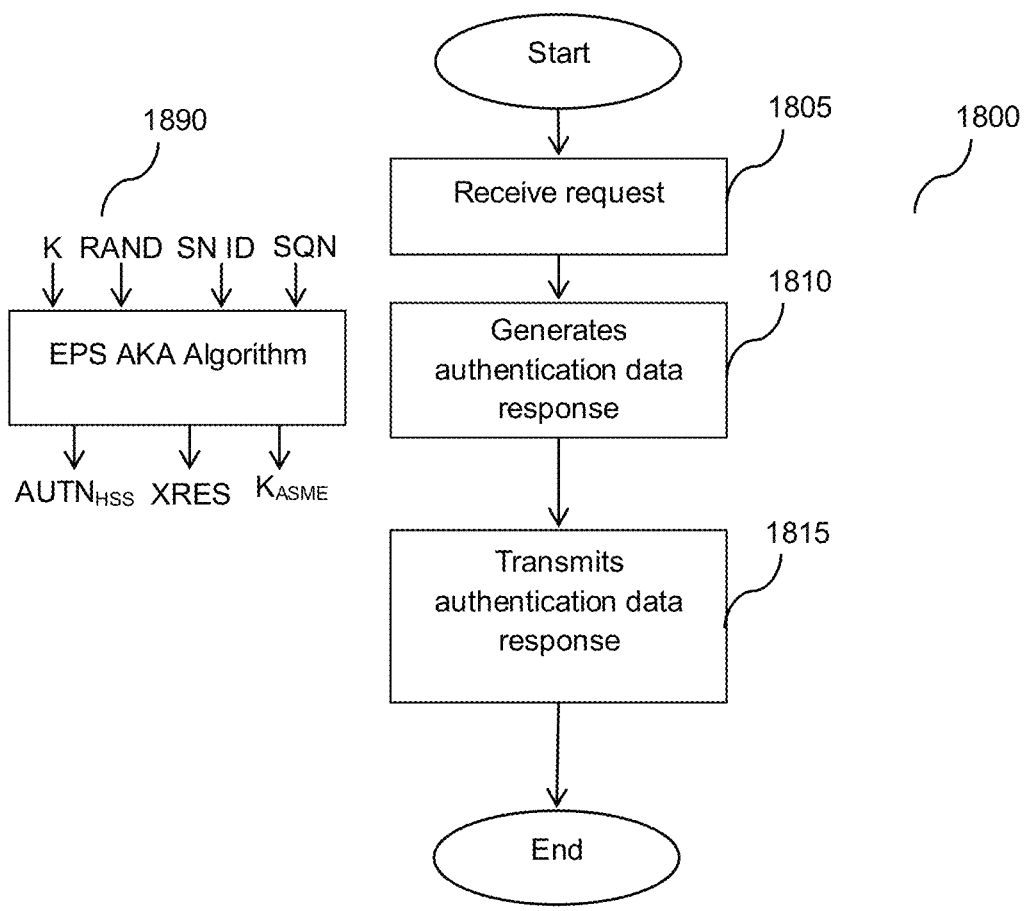
FIG. 18 illustrating a process performed by the HSS in accordance with timing diagram 1500 in accordance with an embodiment of this disclosure.

FIG. 18 illustrates a process flow 1800 performed by the HSS in the core network in accordance with the first part of the unified authentication framework as described with reference to timing diagram 1500. Process 1800 begins with step 1805 by receiving the Authentication Data Request from the network authentication entity.

In step 1810, the HSS generates an Authentication Data Response using AKA algorithm 1890 to obtain an authentication vector. The input parameters for the AKA algorithm include IK, RAND, SN ID, SQN. The output parameters for the AKA algorithm include AUTN, XRES, and a 128-bit session key for encryption (CK) (also known as KASME). RAND is a random number derived by the HSS. The Authentication Data Response contains RAND, AUTN, XRES, IK, and CK.

The Authentication Data Response is then transmitted to the network authentication entity in step 1815. Process 1800 ends after step 1815.

Figure 19:
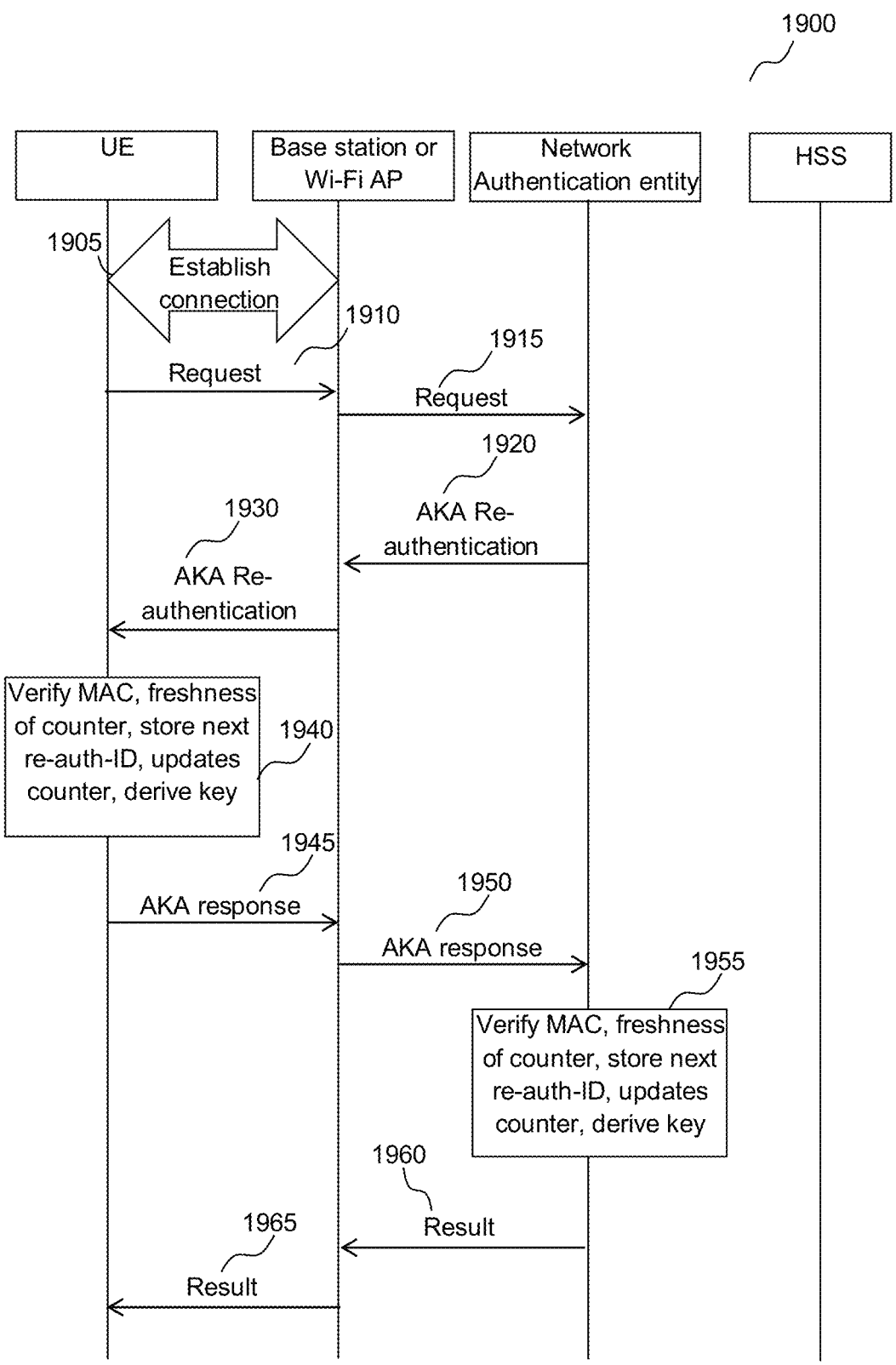
FIG. 19 illustrating a timing diagram of a Fast Re-authentication procedure in accordance with the second part of the unified authentication framework in accordance with an embodiment of this disclosure.

FIG. 19 illustrates a timing diagram 1900 of a Fast Re-authentication procedure in accordance with the second part of the unified authentication framework. The Fast Re-authentication is based on AKA Fast Re-authentication procedure. It is important to note that there may be slight differences in the Fast Re-authentication procedure and this is dependent on the communication devices in the UE. The main differences would be highlighted in the description below with reference to timing diagram 1900.

Timing diagram 1900 begins with 1905 where the UE establishes a connection with a base station of 3GPP access network (if the communication device is a cellular entity) or a Wi-Fi AP (if the communication device is a Wi-Fi entity). The Wi-Fi AP may be an Evolved Packet Data Gateway (ePDG) or a Trusted WLAN Access Gateway/Proxy (TWAG/TWAP).

In step 1910, in response to establishing the connection, the UE requests access to cellular access network by sending a Request containing the UE's ID, the Fast Re-authentication ID and a flag to the base station (if the communication device is a cellular entity). In the case where communication device of the UE is a Wi-Fi entity, the Wi-Fi AP initiates an AKA authentication process by sending the UE a request message. In response, the Wi-Fi entity of the UE responds to the Wi-Fi AP with a response message containing the UE's ID, Fast Re-authentication ID and a flag.

In step 1915, the base station forwards the Request message to the network authentication entity. In the case of Wi-Fi AP, the Wi-Fi AP transmits the response message in the form of a Request message to the network authentication entity. The Wi-Fi AP also informs the network authentication entity the access type (cellular access or non-cellular access).

In step 1920, the network authentication entity replies to the base station or Wi-Fi AP with an AKA-Re-authentication request with four fields (*counter, *nonce, *new-re-auth-ID, MAC) in it. The fields with "*" mark means the field is encrypted with the encryption key for AKA Fast Re-authentication. The *counter is the value of the counter for AKA Fast Re-authentication. The network authentication entity and the UE increase the value by at least 1 after every re-authentication. This allows the UE to check the freshness of the message. The *nonce is a random number chosen by the network authentication entity. The *new-re-auth-ID is the Fast Re-authentication ID for next re-authentication. The MAC is the message authentication code for verifying the creator of the message.

In step 1930, the base station or Wi-Fi AP forwards the AKA-Re-authentication request to the UE.

In step 1940, the UE authenticates the network authentication entity by verifying the correctness of MAC and the freshness of counter. The UE then stores the new Re-auth-ID as the new Fast Re-authentication ID. The UE further updates the local counter with the received counter's value plus 1 and derives keys for cellular or non-cellular access, depending on the type of communication devices.

The keys for cellular access include the key for encrypting the traffic between the UE and the base station and the key for integrity protection of such traffic. Further, the keys for non-cellular access include the key for encrypting the traffic between the UE and the Wi-Fi AP and the key for integrity protection of such traffic. The received counter is considered fresh if and only if its value is not smaller than the counter stored by the UE.

In step 1945, the UE transmits an AKA-Re-authentication response the base station or Wi-Fi AP containing two fields (*counter and MAC). The value of the counter should be the same as the received counter's value.

In step 1950, the base station or Wi-Wi AP forwards the AKA-Re-authentication response to the network authentication entity.

In step 1955, the network authentication entity authenticates the UE by verifying the MAC of the received AKA-Re-authentication response message and the counter's value. The network authentication entity derives keys for cellular or non-cellular access and stores the new Fast Re-authentication ID. The network authentication entity then increases its counter by 1. The received counter's value should be the same as the value of the network authentication entity's counter.

In step 1960, the network authentication entity informs the base station or Wi-Fi AP the result of the Fast Re-authentication. If the authentication is successful, the result would contain the keys for the UE's cellular or non-cellular access. In step 1665, the base station or Wi-Fi AP forwards the results to the UE.

Figure 20:
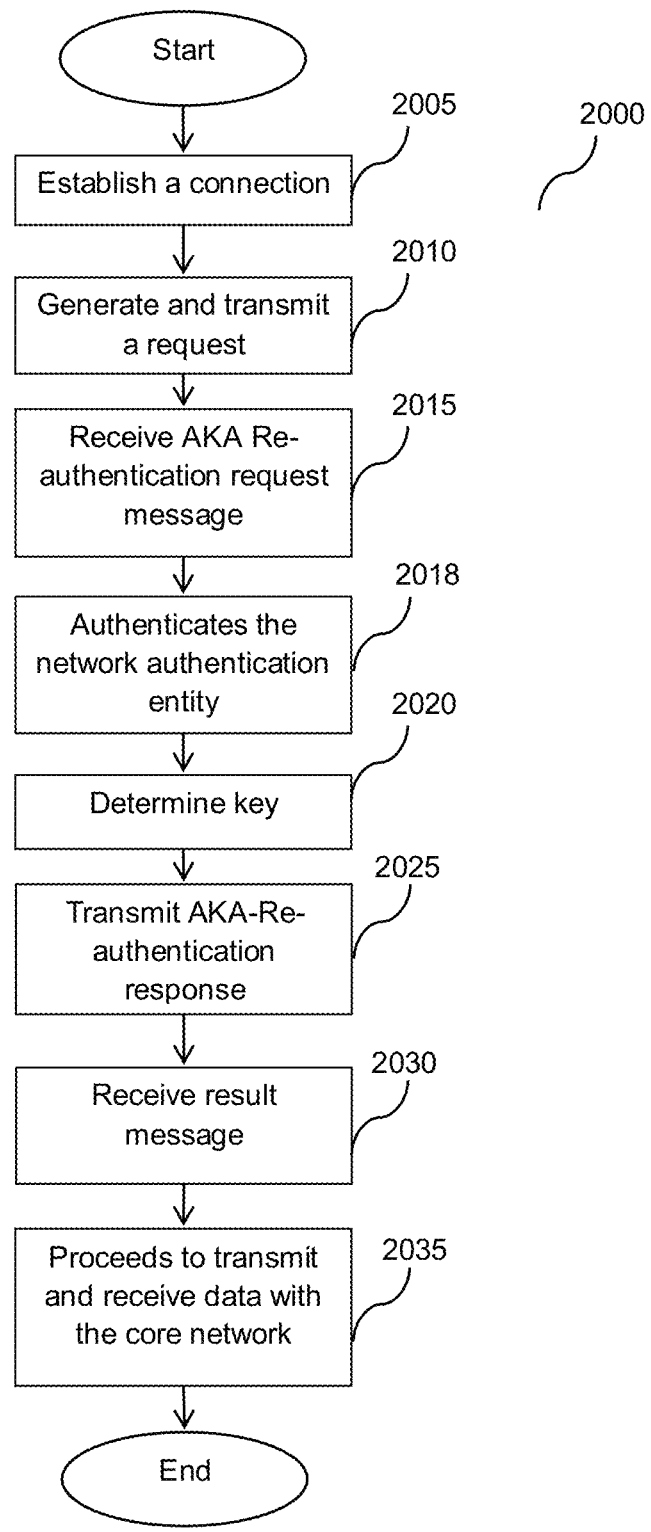
FIG. 20 illustrating a process performed by either one of communication devices 1 and 2 in accordance with timing diagram 1900 in accordance with an embodiment of this disclosure.

FIG. 20 illustrates a process flow 2000 performed by the UE device in accordance with the second part of the unified authentication framework as described with reference to timing diagram 1900. Process 2000 begins with step 2005 by establishing a connection with a base station of 3GPP access network (if the communication device is a cellular entity) or a Wi-Fi AP (if the communication device is a Wi-Fi entity).

In step 2010, in response to establishing the connection, the UE requests access to cellular access network by sending a Request containing the UE's ID, the FRID and a flag to the base station (if the communication device is a cellular entity). Subsequently, the base station forwards the Request message to the network authentication entity. In the case where communication device of the UE is a Wi-Fi entity, the Wi-Fi AP initiates an AKA authentication process by sending the UE a request message. In response, the Wi-Fi entity of the UE responds to the Wi-Fi AP with a response message containing the UE's ID, FRID and a flag. Subsequently, the Wi-Fi AP forwards the response message in the form of a Request message to the network authentication entity. The flag contains an indication that the FRID does not belong to the communication device requesting for access.

In step 2015, the UE receives an AKA Re-authentication request message from the network authentication entity. The AKA Re-authentication request message includes *counter, *nonce, *new FRID and MAC.

In step 2018, the UE authenticates the network authentication entity by verifying the correctness of MAC and the freshness of counter. The received counter is considered fresh if and only if its value is not smaller than the counter stored by the UE. The correctness of MAC is determined in the following manner. The UE decrypts the *counter, *nonce and *new FRID from the AKA Re-authentication request message. The UE then verifies MAC by generating a MAC with the decrypted counter, nonce and new FRID using the same MAC generation function used by the network authentication entity with SK. If the MAC is valid, step 2018 continues with storing the new FRID as the new Fast Re-authentication ID in the security context. The UE further updates the local counter with the received counter's value plus 1. In the case where an authentication management module is available, the security context is store on the authentication management module. If an authentication management module is not available, the security context is stored on either the first or second communication device.

In step 2020, the UE determines keys for cellular or non-cellular access, depending on the type of communication devices. The keys for cellular access include the key for encrypting the traffic between the UE and the base station and the key for integrity protection of such traffic. Further, the keys for non-cellular access include the key for encrypting the traffic between the UE and the Wi-Fi AP and the key for integrity protection of such traffic.

In step 2025, the UE transmits an AKA Re-authentication response message to the network authentication entity via base station or Wi-Wi AP containing two fields (*counter and MAC). The value of the counter should be the same as the received counter's value. Alternatively, the AKA Re-authentication response may contain only the counter with or without encryption without departing from the disclosure.

In step 2030, the UE receives a result message from the network authentication entity via the base station or Wi-Fi AP. The result message would indicate whether the authentication is successful. If the authentication is successful, process 2000 proceeds to 2035 and continue to transmit and receive data with the core network using the keys derived in step 2020. Process 2000 ends after 2035.

Figure 21:
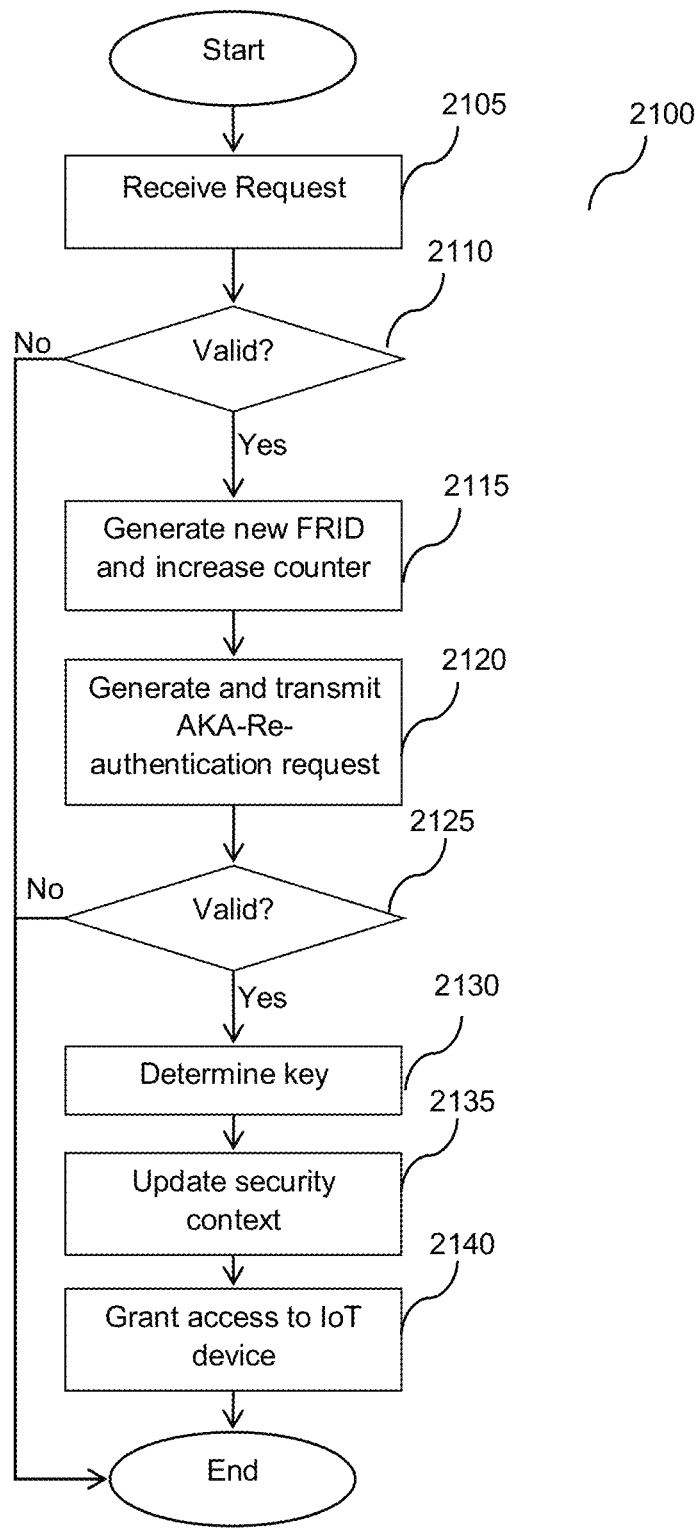
FIG. 21 illustrating a process performed by the network authentication entity in accordance with timing diagram 1900 in accordance with an embodiment of this disclosure.

FIG. 21 illustrates a process flow 2200 performed by the network authentication entity in the core network in accordance with the second part of the unified authentication framework as described with reference to timing diagram 1900. Process 2100 begins with step 2205 by receiving the Request message from the base station (if the communication device is a cellular entity) or Wi-Fi AP (if the communication device is a Wi-Fi entity). The Request message contains the UE's ID, FRID and flag.

In step 2110, the network authentication entity retrieves the security context associated with the UE's ID from its database. The security context comprises the FRID, secret keys (SK), and counter. The network authentication entity then determines whether the FRID from the Request message is identical to the FRID stored on the database. Process 2100 ends if the FRID from the Request message is not identical to the FRID stored on the database. If the FRID from the Request message is identical to the FRID stored on the database, process 2100 proceeds to step 2115

In step 2115, the network authentication entity generates a new FRID for the next re-authentication procedure by combining the UE's ID with a random number. The counter is also increased by 1. The network authentication entity and the UE increase the value by at least 1 after every re-authentication. This allows the UE to check the freshness of the message. The new FRID and counter are updated to the security context associated to the UE's ID. A nonce which is a random number chosen by the network authentication entity is also updated to the security context associated to the UE's ID.

In step 2120, the network authentication entity generates and transmits an AKA-Re-authentication request with *counter, *nonce, *new FRID and MAC. The fields with "*" mark means the field is encrypted with the encryption key for AKA Fast Re-authentication. The MAC is generated using secret key (SK). The input parameters of MAC include counter, nonce, new FRID, and can be expressed in the following manner, $$MAC = MAC_{SK}(counter \| nouce \| new\ FRID)$$

In step 2125, the network authentication entity receives the AKA-Re-authentication response message. In response, the network authentication entity authenticates the UE by verifying the MAC of the received AKA-Re-authentication response message and the counter's value. The received counter's value should be the same as the value of the network authentication entity's counter. Process 2100 ends if the authentication is not valid. If the authentication is valid, process 2100 proceeds to step 2130.

In step 2130, the network authentication entity derives keys for cellular or non-cellular access. This process is similar to step 2020 of process 2000.

In step 2135, the network authentication entity stores the incremented counter and the new FRID in the security context associated to the UE's ID.

In step 2140, the network authentication entity generates and transmits a result message to the base station or Wi-Fi AP to inform the UE on the result of the Fast Re-authentication. The result message would contain the keys for the UE's cellular or non-cellular access. It is noted that the result message is not transmitted directly to the UE. Instead, if keys are available in the result message, the network entity would remove the keys from the result message and simply indicate that the authentication is successful to the UE. Process 2100 ends after step 2140.

Multiple Collaborative Re-Authentication of Heterogeneous Access

Figure 22:
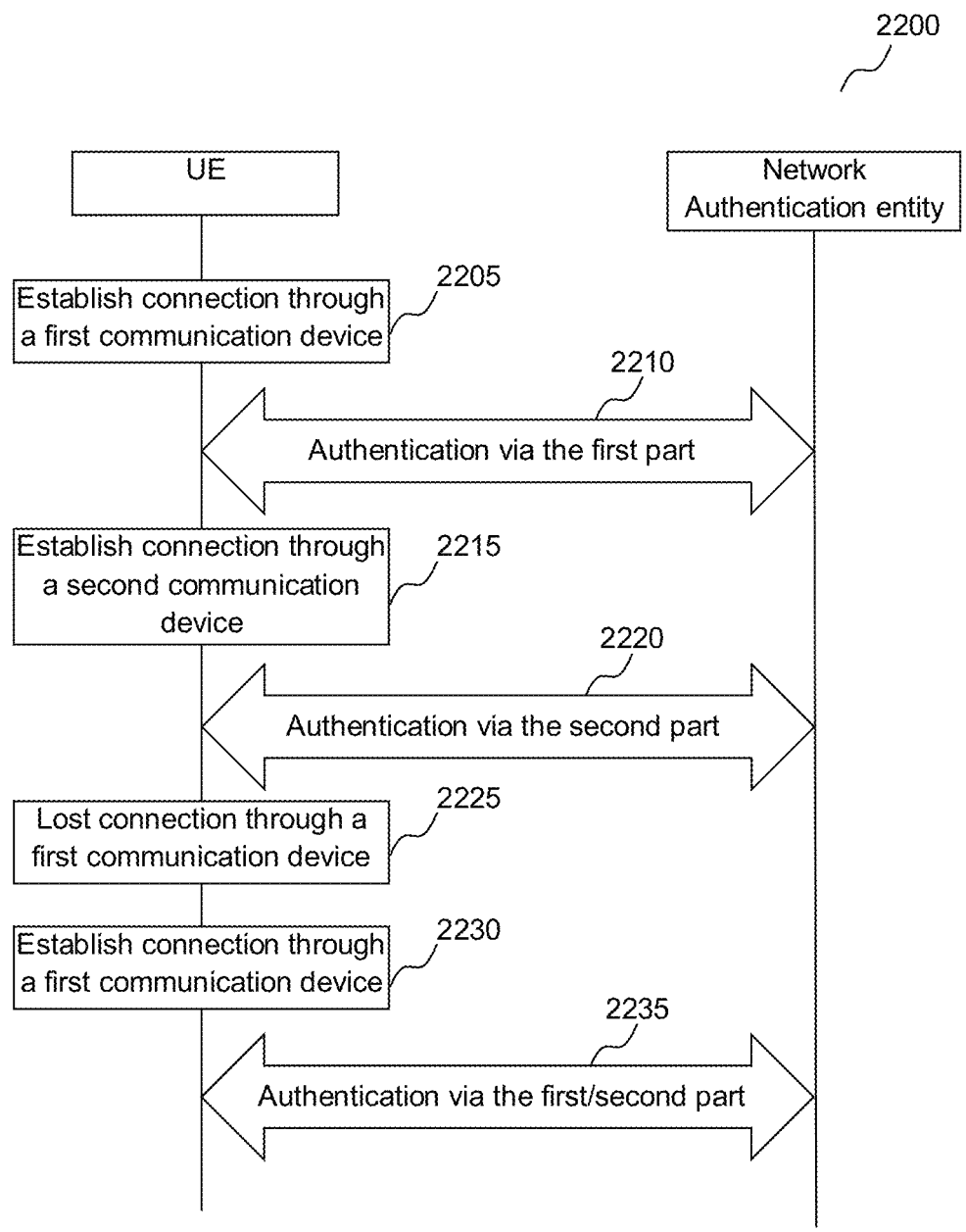
FIG. 22 illustrating an embodiment showing multiple collaborative authentications in accordance with an embodiment of this disclosure.

FIG. 22 illustrates an embodiment showing multiple collaborative authentications. The first communication device of the UE begins with establishing a connection with either a cellular gateway such as 3GPP gateway or a non-cellular gate such as a Wi-Fi AP via the first part of the unified authentication framework in step 2205.

In step 2210, the UE authenticates with the network authentication entity and performs a full authentication via the first part to authenticate each other.

In step 2215, the second communication device of the UE establishes a connection with either a cellular gateway such as 3GPP gateway or a non-cellular gate such as a Wi-Fi AP via the second part of the unified authentication framework.

In step 2220, the UE authenticates with the network authentication entity and performs a Fast Re-authentication via the second part to authenticate each other.

In step 2225, if the first communication device of the UE loses the connection to the gateway, the first communication device of the UE re-establishes connection in step 2230. In step 2235, the UE establish a connection with a gateway using either the first or second part of the unified authentication framework. The gateway could be the same gateway in 2205. Alternatively, the gateway may be a gateway different from the one in 2205.

It is noted that the UE and the network authentication entity can perform many fast re-authentications after the full authentication. Further, the first and second communication devices of the UE can share one set of Fast Re-authentication ID, Fast Re-authentication key(s) and counter. Alternatively, both the UE and the authentication server may generate two sets of Fast Re-authentication ID, Fast Re-authentication key(s) and counter during or after the full authentication. One set is for the first communication device, and the other set is for the second communication device. The UE and the network authentication entity will store and maintain two sets after generating them.

It is envisioned that the unified authentication framework can be applied in the communication between mobile user equipment with network with different access technologies, for example, the 5G networks. The unified authentication framework allows fast authentication and unified authentication management for mobile networks with heterogeneous access. This simplifies authentication management, enables fast handover between heterogeneous access techniques, and improves user experience. It also reduces the workload of HSS.

Figure 23:
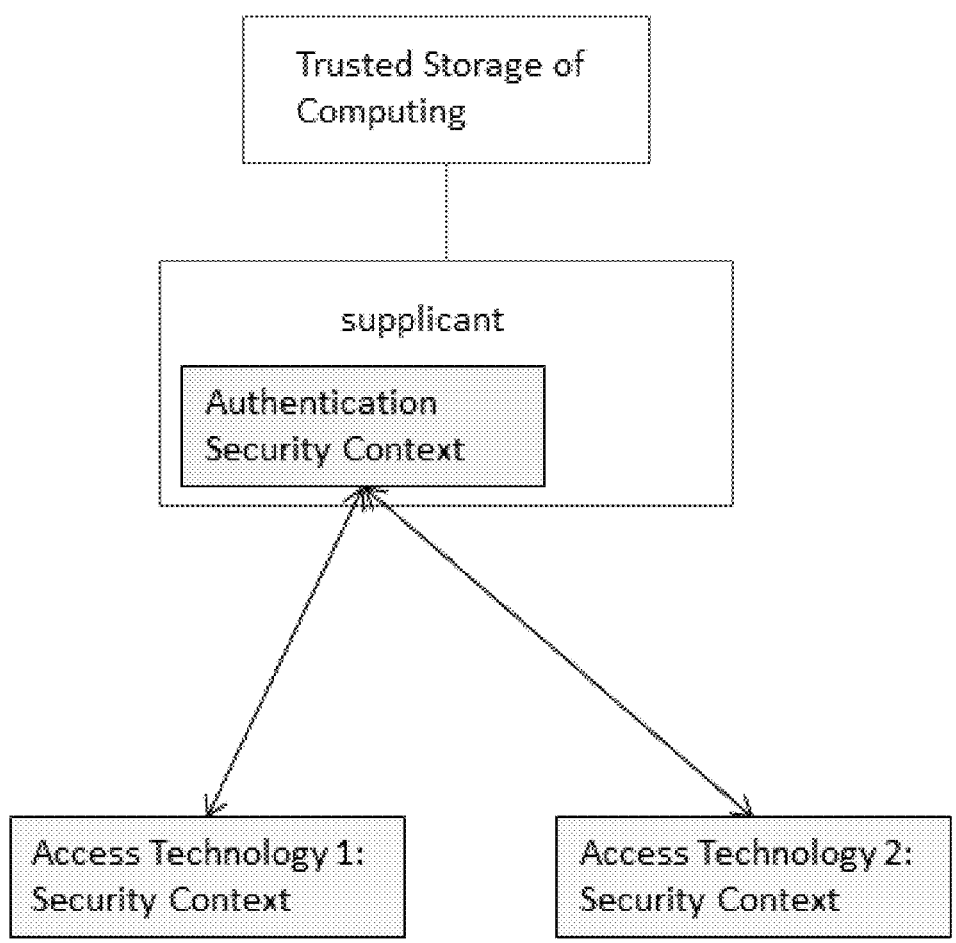
FIG. 23 illustrates an embodiment showing multiple access technologies.

FIG. 23 illustrates an embodiment showing multiple access technologies. The next generation network system will support multiple access technologies, including the next generation radio, the Wi-Fi access technologies, and Bluetooth etc. Many of the UE supports multiple access technology and UE may establish multiple connections simultaneously to the network with the same 3GPP credentials. Since SA2 has proposed a uniformed authentication framework and a security context structure has been defined at the network side. A security context structure has not been defined for UE yet. Therefore, in this propose, we proposed an security context structure at UE side with the uniform authentication framework and network side security context structure in consideration.

With the 5G system, it is common that UE may connect to network with simultaneous connections. Different connections may reside on different access technology. However, different access technology may authentication with network with same 3GPP credentials. In such scenarios, how does the UE authenticate with network and how it derives security context for each access technology need to be studied.

In this contribution, we propose that different access technology share the same supplicant at UE side. The supplicant is responsible for the authentication for different access technologies.

When the supplicant performs mutual authentication with authentication unit at the network side (CP-AU), if a security context has not been established at the supplicant, then the UE establish a security context within the supplicant.

If the supplication already has one established security context, then the UE can use the existing security context for mutual authentication with the network authentication entity. If the authentication is success, both the Supplicant and CP-AU updated the security context.

Supplicant transmits the derived security context to the relative access technology for the protection of communications.

FIG. 24

Figure 24:
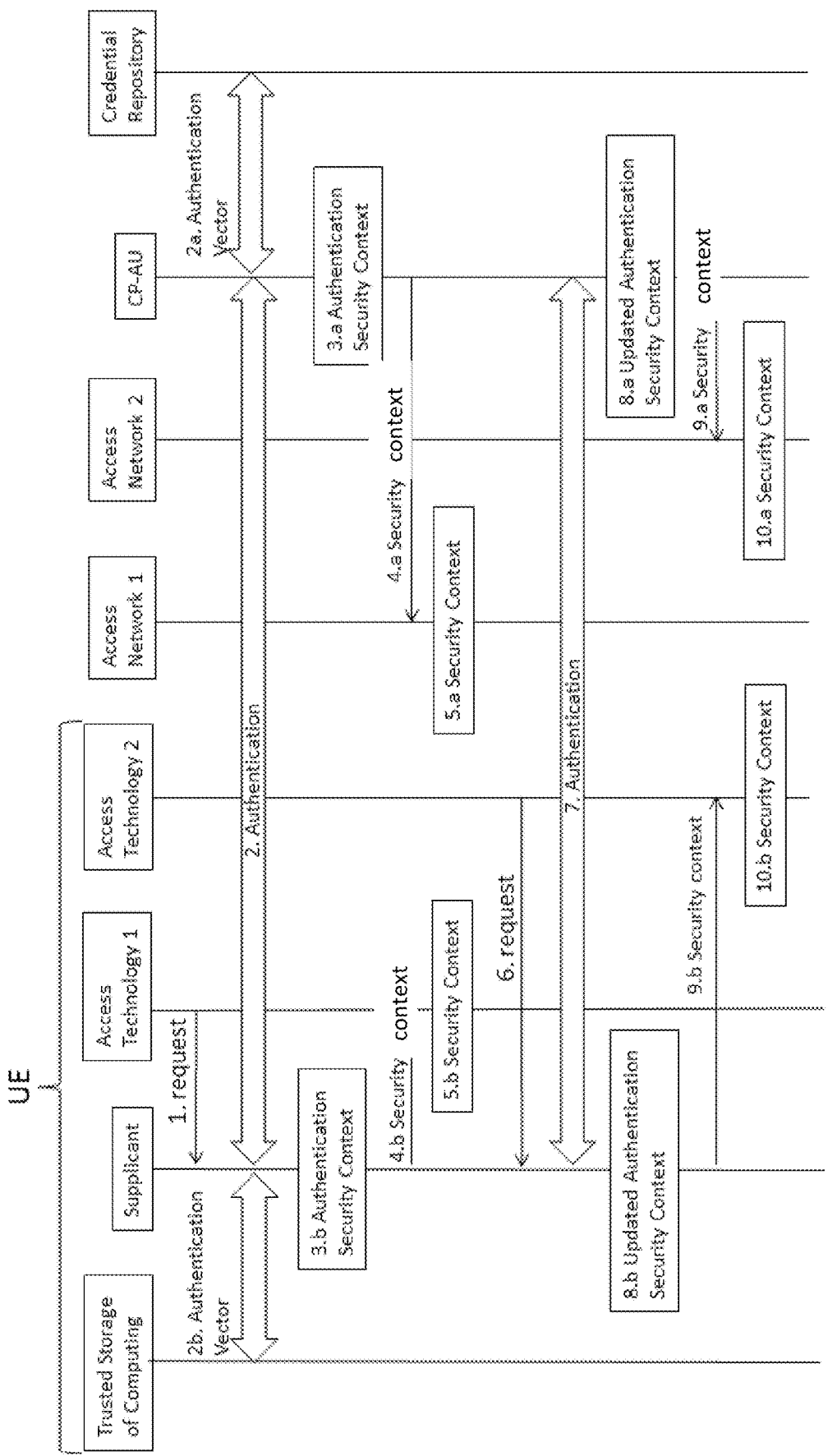
FIG. 24 shows the detailed procedure for UE with two different access technologies to establish security context with the uniform authentication framework.

FIG. 24 shows the detailed procedure for UE with two different access technologies to establish security context with the uniform authentication framework and the security context derivation method proposed above:

The device with access technology 1 within the UE sends a request to Supplicant for authentication.

Supplicant authentication with CP-AU within the core network, during which supplicant and CP-AU communicate with trusted storage of computing and credential repository for authentication vectors respectively (2a and 2b).

Supplicant and CP-AU establish Authentication Security Context with both CP-AU and Supplicant (3a and 3b)

Supplicant and CP-AU transmit security context to the relative device at the UE side and Access Network at network side.

Both devices and AN installed the security context and use them for data/signaling protection.

The device with access technology 1 within the UE sends a request to Supplicant for authentication.

Supplicant authentication with CP-AU within the core network. The authentication procedure reuse the security context established through the authentication for the first access technology.

Supplicant and CP-AU update Authentication Security Context.

Supplicant and CP-AU transmit security context to the relative device (device with access technology 2) at the UE side and Access Network at network side.

Both devices and AN installed the security context and use them for data/signaling protection.

The above is a description of embodiments of a method and system of a unified authentication framework for collaborative authenticating between a mobile device and a core network. It is foreseeable that those skilled in the art can and will design alternative method and system based on this disclosure that infringe upon this invention as set forth in the following claims.

What is claimed is:

1. A method for a user equipment (UE) communicating with a core network, the method comprising:
   authenticating, by the core network, a first communication device of the UE, wherein the first communication device of the UE is associated with a first access technology;
   generating, by the core network, a security context of the first communication device of the UE when the authentication is successful, wherein the security context of the first communication device comprises a fast re-authentication ID;
   receiving, by the core network, a request for authentication from a second communication device of the UE through a second access technology;
   determining, by the core network, whether the request for authentication includes a fast re-authentication ID; and
   initiating, by the core network, a fast re-authentication procedure in response to determining the request comprises a fast re-authentication ID,
   wherein initiating the fast re-authentication procedure includes
   updating, by the core network, the security context of the first communication device of the UE.

2. The method according to the claim 1, wherein updating the security context comprises updating, by the core network, a counter in the security context.

3. The method according to the claim 2, wherein the first access technology is 3 GPP access technology, and the second access technology is non-3GPP access technology.

4. The method according to the claim 2, wherein the first access technology is non-3GPP access technology, and the second access technology is 3GPP access technology.

5. The method according to claim 1, further comprising:
transmitting, by the core network, the updated security context to an access network such that the access network uses the updated security context for signaling protection.

6. A method for a user equipment (UE) communicating with a core network, the method comprising:
generating, by the UE, a security context of a first communication device of the UE in response to a successful authentication of the first communication device, wherein the first communication device is associated with a first access technology, and wherein the security context of the first communication device comprises a fast re-authentication ID;
sending, by the UE, a request to the core network through a second access technology, wherein the request comprises the fast re-authentication ID; and
updating, by the UE, the security context when the first communication device of the UE is authenticated successfully.

7. The method according to the claim 6, wherein updating the security context comprises updating, by the UE, a counter in the security context.

8. The method according to the claim 7, wherein the first access technology is 3GPP access technology, and the second access technology is non-3GPP access technology.

9. The method according to the claim 7, wherein the first access technology is non-3GPP access technology, and the second access technology is 3GPP access technology.

10. An apparatus comprising:
at least one memory to store instructions; and
at least one processor coupled to the at least one memory, and to execute the stored instructions to:
authenticate a first communication device of a user equipment (UE), wherein the first communication device of the UE is associated with a first access technology;
generate a security context of the first communication device of the UE when the authentication is successful, wherein the security context of the first communication device comprises a fast re-authentication ID;
receive a request for authentication from a second communication device of the user equipment (UE) through a second access technology;
determine whether the request is for fast re-authentication;
and
initiate a fast re-authentication procedure in response to determining the request comprises the fast re-authentication ID, wherein the procedure includes updating the security context of the first communication device of the UE.

11. The apparatus according to the claim 10, wherein when updating the security context, the at least one processor further executes the stored instructions to
update a counter in the security context.

12. The apparatus according to the claim 11, wherein the first access technology is 3GPP access technology, and the second access technology is non-3GPP access technology.

13. The apparatus according to the claim 11, wherein the first access technology is non-3GPP access technology, and the second access technology is 3GPP access technology.

14. The apparatus according to claim 12, wherein the processor further executes the stored instructions to
transmit the updated security context to an access network such that the access network uses the updated security context for signaling protection.

15. A user equipment (UE) for communicating directly with a core network, the UE comprising:
at least one memory to store instructions; and
at least one processor coupled to the at least one memory, and to execute the stored instructions to:
generate a security context of first communication device of the UE in response to successfully authenticating the first communication device, wherein the first communication device is associated with a first access technology, and wherein the security context of the first communication device comprises a fast re-authentication ID;
send a request to the core network through a second access technology, wherein the request comprises the fast re-authentication ID; and
update the security context when the first communication device of the UE is authenticated successfully.

16. The UE according to the claim 15, wherein when updating the security context, the at least one processor further executes the stored instructions to
update a counter in the security context.

17. The UE according to the claim 16, wherein the first access technology is 3GPP access technology, and the second access technology is non-3GPP access technology.

18. The UE according to the claim 16, wherein the first access technology is non-3GPP access technology, and the second access technology is 3GPP access technology.

19. A non-transitory computer readable medium comprising processor-executable instructions, which when executed by at least one processor, cause the at least one processor to perform the following:
authenticating a first communication device of a user equipment (UE), wherein the first communication device of the UE is associated with a first access technology;
generating a security context of the first communication device in response to successfully authenticating the first communication device wherein the security context of the first communication device comprises a fast re-authentication ID;
receiving a request for authentication from a second communication device of the UE through a second access technology;
determining whether the request is for fast re-authentication; and
initiating a fast re-authentication procedure in response to determining that the request comprises the fast re-authentication ID, wherein the fast re-authentication procedure comprises updating the security context of the first communication device of the UE.

20. A non-transitory computer readable medium comprising processor-executable instructions, which when executed by at least one processor, cause the at least one processor to perform the following:
generating a security context of a first communication device of a user equipment (UE) when the first communication device is successfully authenticated, wherein the first communication device is associated with a first access technology, and wherein the security context of the first communication device comprises a fast re-authentication ID;
sending a request to a core network through a second access technology, wherein the request comprises the fast re-authentication ID; and updating the security context when the first communication device is successfully authenticated.

\* \* \* \* \*